(12) United States Patent
Murphy et al.

(10) Patent No.: US 11,958,066 B2
(45) Date of Patent: Apr. 16, 2024

(54) SUSTAINABLE PACKAGING ASSEMBLIES

(71) Applicant: RLM Group Ltd., Mt. Kisco, NY (US)

(72) Inventors: Robert L. Murphy, Mt. Kisco, NY (US); Charles A. Curtiss, Mt. Kisco, NY (US)

(73) Assignee: RLM Group Ltd., Mt. Kisco, NY (US)

( * ) Notice: Subject to any disclaimer, the term of this patent is extended or adjusted under 35 U.S.C. 154(b) by 0 days.

(21) Appl. No.: 18/007,998

(22) PCT Filed: Jun. 2, 2021

(86) PCT No.: PCT/US2021/035440
§ 371 (c)(1),
(2) Date: Dec. 2, 2022

(87) PCT Pub. No.: WO2021/247697
PCT Pub. Date: Dec. 9, 2021

(65) Prior Publication Data
US 2023/0201850 A1     Jun. 29, 2023

Related U.S. Application Data

(60) Provisional application No. 63/033,480, filed on Jun. 2, 2020.

(51) Int. Cl.
*B05B 11/10* (2023.01)
*B05B 11/00* (2023.01)
*B05B 11/02* (2023.01)

(52) U.S. Cl.
CPC .... *B05B 11/1035* (2023.01); *B05B 11/00442* (2018.08); *B05B 11/0054* (2013.01); *B05B 11/007* (2013.01); *B05B 11/026* (2023.01)

(58) Field of Classification Search
CPC ............... B05B 11/1035; B05B 11/026; B05B 11/0054; B05B 11/007; B05B 11/00442; B65D 83/005; G01F 11/288
(Continued)

(56) References Cited

U.S. PATENT DOCUMENTS 2,758,755 A    8/1956 Schafler
2,931,338 A    4/1960 Williams
(Continued)

FOREIGN PATENT DOCUMENTS

GB    2536886 A    10/2016
GB    2564851 A    1/2019
(Continued)

OTHER PUBLICATIONS

International Search Report for International Patent Application No. PCT/US2021/035440, dated Oct. 21, 2021.
(Continued)

*Primary Examiner* — Lien M Ngo
(74) *Attorney, Agent, or Firm* — K&L Gates LLP

(57) ABSTRACT

A packaging for storing and dispensing fluid contents comprises a body defining a reservoir, wherein the body comprises a base with an aperture defined therein, a receptacle configured to store the fluid contents therein is received within the reservoir of the body, and a one-way valve positioned in the aperture. The packaging further comprises an actuator comprising a channel and an opening configured to dispense the fluid contents out of the packaging. An intermediate connecting member comprising a first connection portion configured to engage the actuator, a bellow, a second connection portion configured to engage the body, and a duckbill valve integrally formed thereon extends between the body and the actuator. The duckbill valve is aligned with the channel, and the fluid contents of the receptacle flow out of the duckbill valve, through the channel, and out of the opening upon a user applying an input to the actuator.

18 Claims, 37 Drawing Sheets

(58) Field of Classification Search
USPC ............... 222/105, 213, 321.9, 632, 633
See application file for complete search history.

(56) References Cited

U.S. PATENT DOCUMENTS

| | | | |
|---|---|---|---|
| 3,589,824 A | | 6/1971 | Andrews |
| 4,469,250 A | | 9/1984 | Evezich |
| 5,234,688 A | | 8/1993 | Gaffer |
| 5,673,824 A | * | 10/1997 | Evans .............. B05B 11/1077 222/321.9 |
| 6,457,613 B1 | | 10/2002 | Patterson |
| 8,403,182 B2 | * | 3/2013 | Lee .................. A47G 19/183 222/389 |
| 8,413,857 B2 | | 4/2013 | Johnson |
| 9,718,070 B2 | | 8/2017 | Aminak et al. |
| 9,894,981 B2 | | 2/2018 | Kim et al. |
| 2006/0065132 A1 | * | 3/2006 | Jongen ............. B65D 83/0055 99/485 |
| 2008/0061089 A1 | | 3/2008 | Wellman |
| 2008/0110938 A1 | | 5/2008 | Sternberg |
| 2013/0078025 A1 | | 3/2013 | Turgeman et al. |
| 2019/0208889 A1 | | 7/2019 | Murphy et al. |
| 2019/0218001 A1 | | 7/2019 | Vredevoogd |

FOREIGN PATENT DOCUMENTS

| | | |
|---|---|---|
| WO | 2010080897 A1 | 7/2010 |
| WO | 2015197599 A1 | 12/2015 |
| WO | 2021002879 A1 | 1/2021 |
| WO | 2021190883 A1 | 9/2021 |

OTHER PUBLICATIONS

Written Opinion for International Patent Application No. PCT/US2021/035440, dated Oct. 21, 2021.

* cited by examiner

SUSTAINABLE PACKAGING ASSEMBLIES

CROSS-REFERENCE TO RELATED APPLICATION

The present application is a national stage application under 35 U.S.C. § 371 of PCT Application No. PCT/US2021/35440, which claims priority to U.S. Provisional Patent Application Ser. No. 63/033,480, filed Jun. 2, 2020, having the same title and inventors as indicated above, and which is incorporated herein by reference in its entirety.

BACKGROUND

Fluid products, such as viscous and/or thin cosmetics or dermatological agents are often packaged in single-use, disposable containers. Upon dispensing the contents of such containers, a consumer is left to dispose of the container and purchase a brand new container with new contents therein. The single-use nature of existing packaging technology goes against sustainability initiatives while existing sustainable packaging dispenses insufficient fluid contents. Among other things, global sustainability initiatives are directed at reducing the number of parts used in each packaging assembly, refilling and/or reusing packaging, recovering packaging, and/or recycling packaging.

SUMMARY

In one general aspect, the present disclosure is directed to a packaging for storing and dispensing fluid contents. The packaging comprises a body defining a reservoir. The body comprises a base with an aperture defined therein. A receptacle, or bag, configured to store the fluid contents therein is received within the reservoir of the body, and a one-way valve is positioned in the aperture. The packaging further comprises an actuator comprising a channel and an opening configured to dispense the fluid contents out of the packaging. An intermediate connecting member comprises a first connection portion configured to engage the actuator, a bellow, a second connection portion configured to engage the body, and a duckbill valve integrally formed thereon extends between the body and the actuator. The duckbill valve is aligned with the channel, and the fluid contents of the receptacle, or bag, flow out of the duckbill valve, through the channel, and out of the opening upon a user applying an input to the actuator.

In another general aspect, the present disclosure is directed to a packaging for storing and dispensing fluid contents. The packaging comprises a body defining a reservoir. The body comprises a base with an aperture defined therein and a receptacle, or bag, configured to store the fluid contents therein. The receptacle, or bag, is configured to be received within the reservoir of the body, and the receptacle, or bag, is refillable. A one-way valve is sized to be closely received in the aperture defined in the base of the body. The packaging further comprises an actuator comprising a channel and an opening configured to dispense the fluid contents out of the packaging. An intermediate connecting member extends between the body and the actuator. The intermediate connecting member comprises a first connection portion configured to engage the actuator, a bellow, a second connection portion configured to engage the body, and a duckbill valve integrally formed thereon. The duckbill valve is aligned with the channel, and the fluid contents of the receptacle, or bag, flow out of the duckbill valve, through the channel, and out of the opening upon a user applying an input to the actuator.

In another general aspect, the present disclosure is directed to a packaging for storing and dispensing fluid contents. The packaging comprises a body defining a reservoir. The body comprises a base with an aperture defined therein, a replaceable receptacle, or bag, configured to store the fluid contents therein, and a one-way valve sized to be closely received in the aperture defined in the base of the body. The replaceable receptacle, or bag, is configured to be attached the body. The packaging further comprises an actuator comprising a channel and an opening configured to dispense the fluid contents out of the packaging. An intermediate connecting member extends between the body and the actuator. The intermediate connecting member comprises a first connection portion configured to engage the actuator, a bellow, a second connection portion configured to engage the body, and a duckbill valve integrally formed thereon. The duckbill valve is aligned with the channel, and the fluid contents of the replaceable receptacle, or bag, flow out of the duckbill valve, through the channel, and out of the opening upon a user applying an input to the actuator.

In another general aspect, the present disclosure is directed to a packaging for storing and dispensing fluid contents is disclosed. The packaging comprises a lid portion and a body portion defining a reservoir. The body portion comprises a hole defined therein, and the hole extends into the reservoir of the body portion. The packaging further comprises a receptacle, or bag, configured to store the fluid contents therein. The receptacle, or bag, is configured to be received within the reservoir of the body portion. A plug is affixed to the body portion. The plug is comprised of a material that prevents the fluid contents from leaking when the lid portion is attached to the body portion, and the plug is configured to wick the fluid contents stored in the receptacle, or bag, when the lid portion is not attached to the body portion.

Global sustainability initiatives demand a reduction in the number of components for each packaging, a package design that can be reused and/or refilled, a recovered package, and/or a recyclable package. The packaging assemblies of the present invention, therefore, can address sustainability concerns in packaging while maintaining dispensing performance. These and other benefits that can be realized through various implementations will be apparent from the description that follows.

FIGURE DESCRIPTIONS

Various features of the exemplary embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DESCRIPTION

Figure 1:
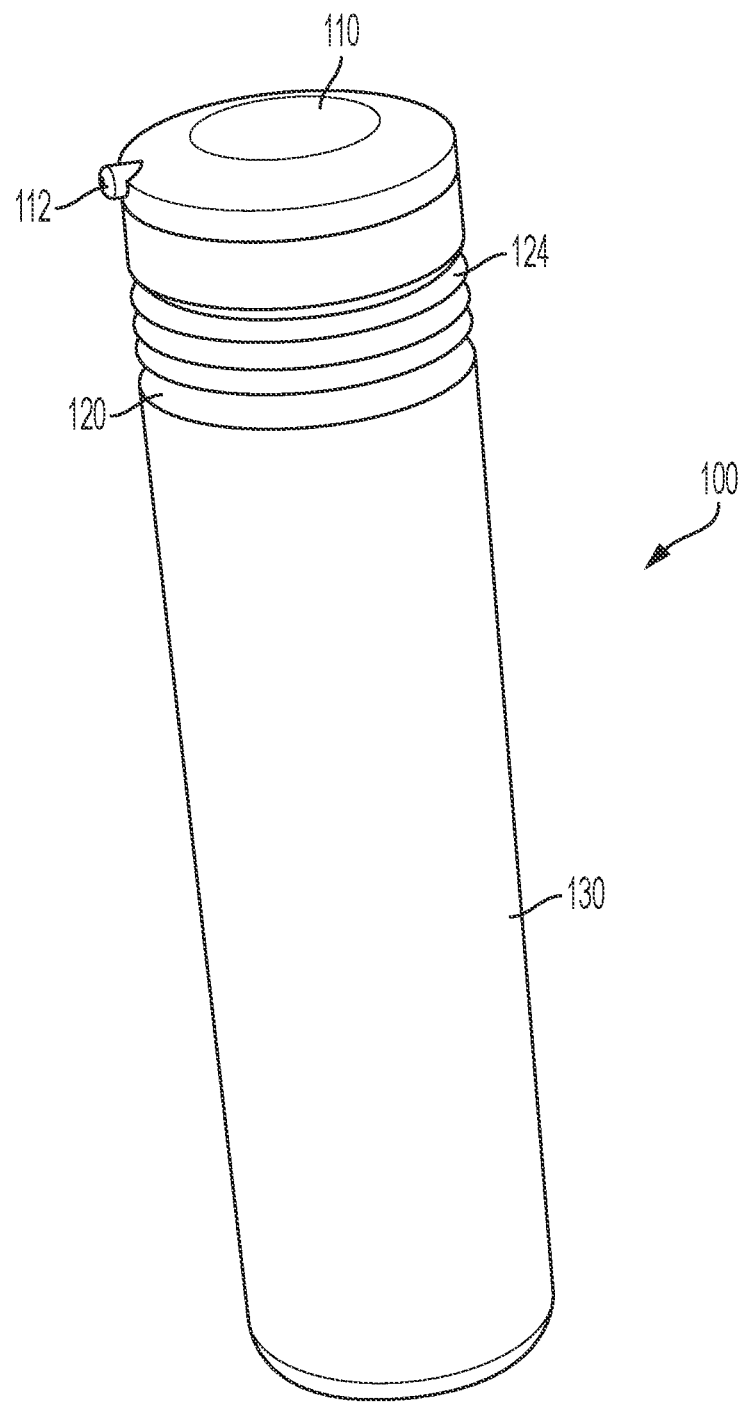
FIG. 1 is a perspective view of a duckbill pump packaging for storing fluid contents therein, the duckbill pump packaging comprising an actuator, an intermediate connecting member, and a body in accordance with one embodiment of the present disclosure.
Figure 2:
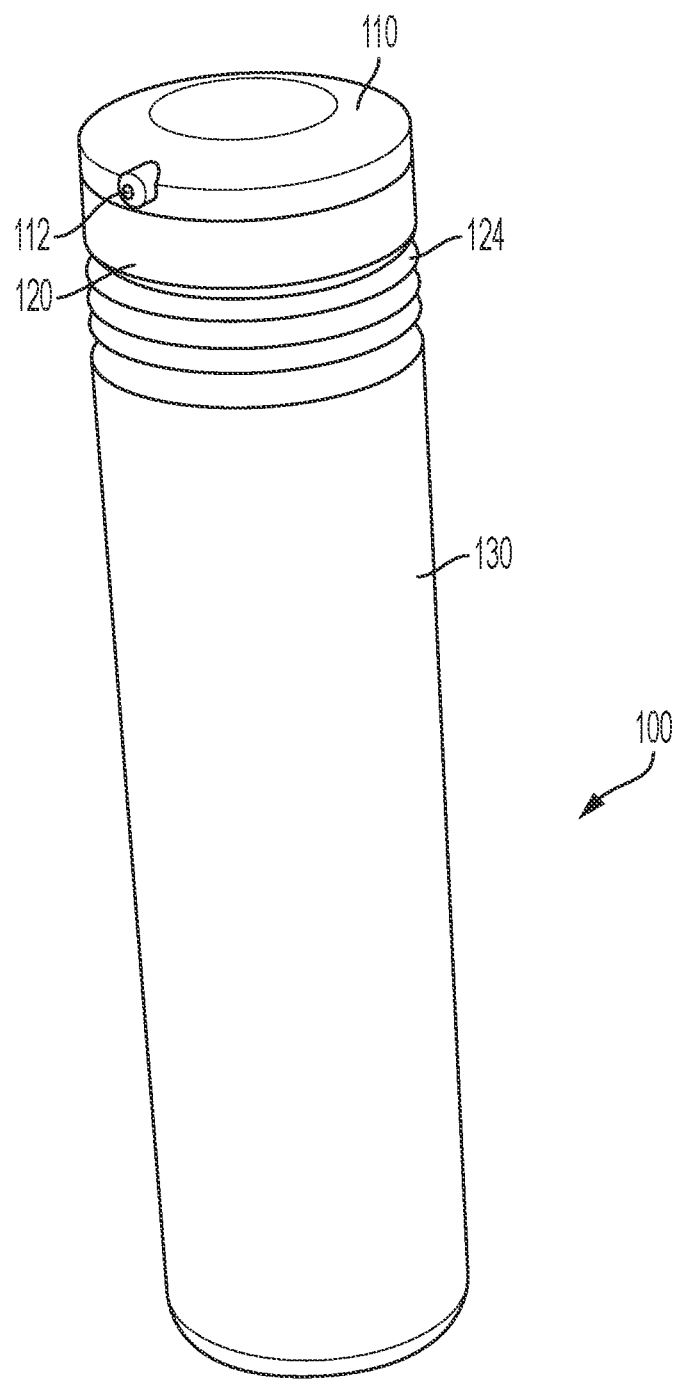
FIG. 2 is a perspective view of the duckbill pump packaging of FIG. 1.

A packaging 100 comprising a duckbill pump assembly is illustrated in FIGS. 1-8. The packaging 100 comprises an actuator 110, an intermediate connecting member 120, and a body 130. The intermediate connecting member 120 extends between and connects the body 130 and the actuator 110. The body 130 defines a reservoir 132 that is sized to receive a receptacle, such as the bag 140 shown in FIG. 3 or the extruded tube 140' shown in FIG. 3A. The receptacles 140, 140' are configured to store fluid contents therein. The contents of the receptacles 140, 140' can comprise a cosmetic agent, for example. In various instances, the receptacles 140, 140' are manufactured from a polymeric and/or plastic material. In various instances, the bag 140 is a poly bag. In various instances, the bag, or receptacle, 140' is a thin, extruded tube. In various instances, the extruded tube 140' comprises a tapered bottom. In other instances, the extruded tube 140' comprises a uniform diameter throughout.

Figure 3:
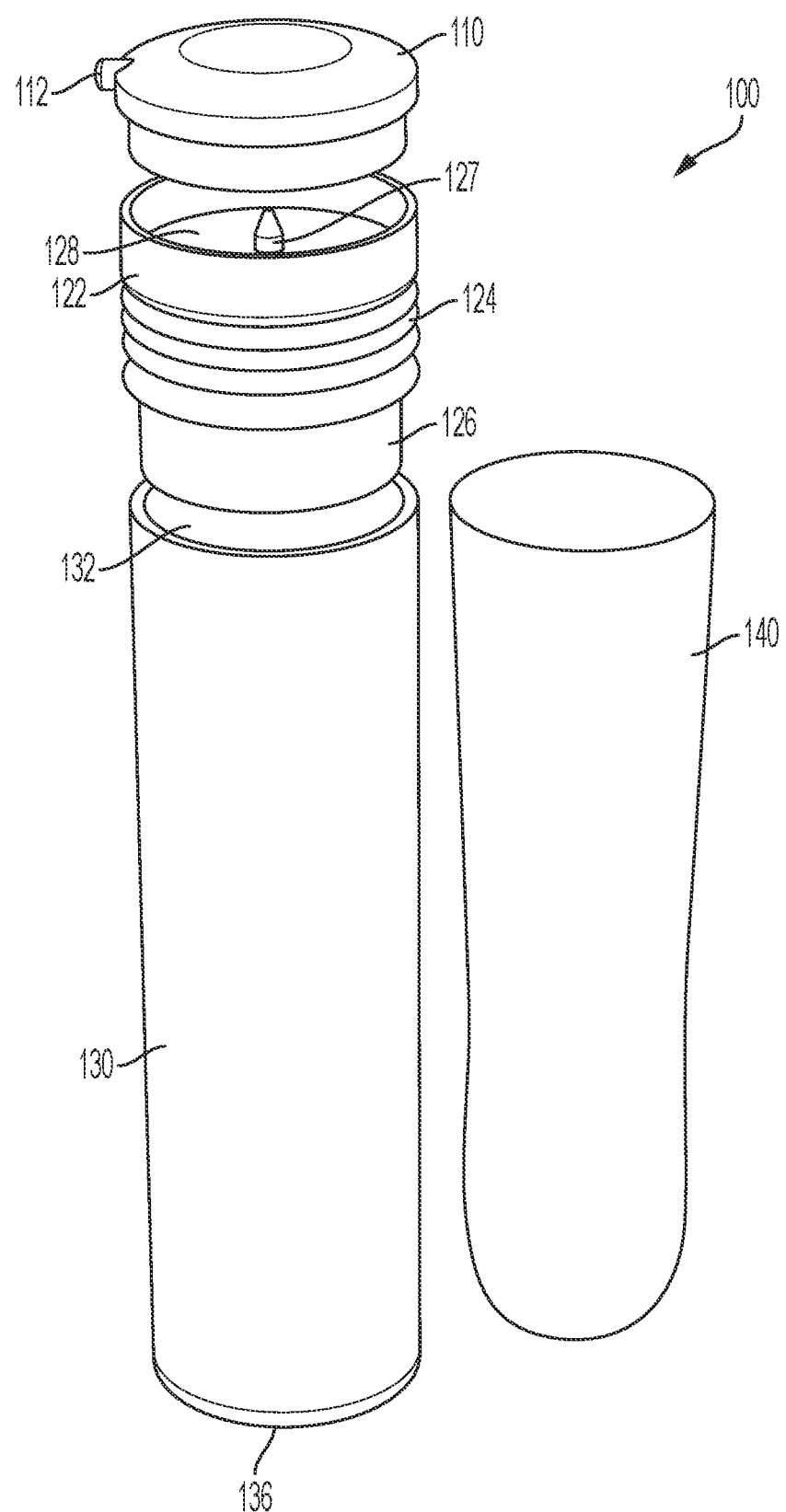
FIG. 3 is an exploded view of the duckbill pump packaging of FIG. 1 comprising a bag.
Figure 3A:
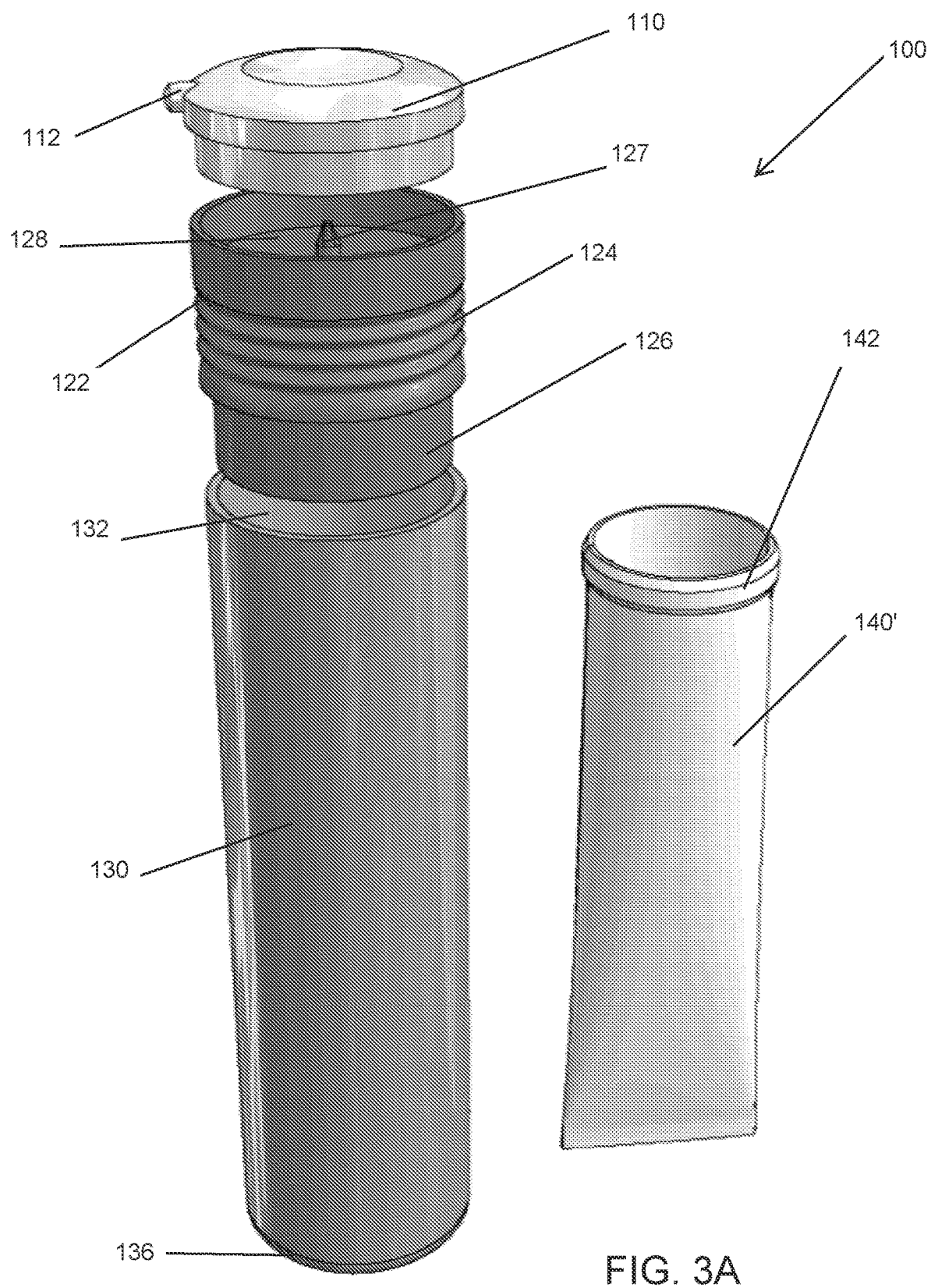
FIG. 3A is an exploded view of the duckbill pump packaging of FIG. 1 comprising an extruded tube receptacle.

The receptacles 140, 140' comprise a thickness that allows for flexibility while also providing sufficient durability to prevent the receptacles 140, 140' from puncturing and/or otherwise being damaged. In various instances, the receptacles 140, 140' comprise a uniform thickness. In other instances, the receptacles 140, 140' comprise one or more portions where the thickness is larger than the thickness of other portions. For example, as shown in FIG. 3A, a top portion 142 of the extruded tube 140' comprises an increased thickness than other portions of the extruded tube 140'. Areas of increased thickness may provide additional strength for securing the receptacle to the packaging and/or additional durability to increase the longevity of the refillable receptacle, for example. In other instances, an additional component is added to reinforce the strength and/or durability of one or more portions of the receptacles 140, 140'.

The body 130 comprises a base 136 with an aperture 135 defined therein. The aperture 135 is sized to receive a one-way venting valve 150. As discussed in greater detail herein, the contents of the body 130 are configured to be dispensed out of the packaging 100. As the fluid contents are being dispensed, the one-way venting valve 150 allows for air to flow into the reservoir 132, thereby causing the receptacle, or bag 140, to shrink and/or compress around the remaining contents. The one-way nature of the venting valve 150 prevents air from escaping out of the reservoir 132.

The intermediate connecting member 120 comprises a first connection portion 122 and a second connection portion 126. The first connection portion 122 is configured to form a connection between the intermediate connecting member 120 and the actuator 110. As shown in FIGS. 3-8, the actuator 110 is configured to be closely received within the first connection member 122 in a press-fit and/or friction-fit manner. Stated another way, an outer circumference of the actuator 110 is sized to be closely received within an inner circumference of the first connection member 122. In other instances, a connection between the actuator 110 and the first connection portion 122 can be formed by engagement between complementary grooves on the inner circumference of the first connection member 122 and the outer circumference of the actuator 110. However, any suitable connection mechanism is envisioned.

Figure 4:
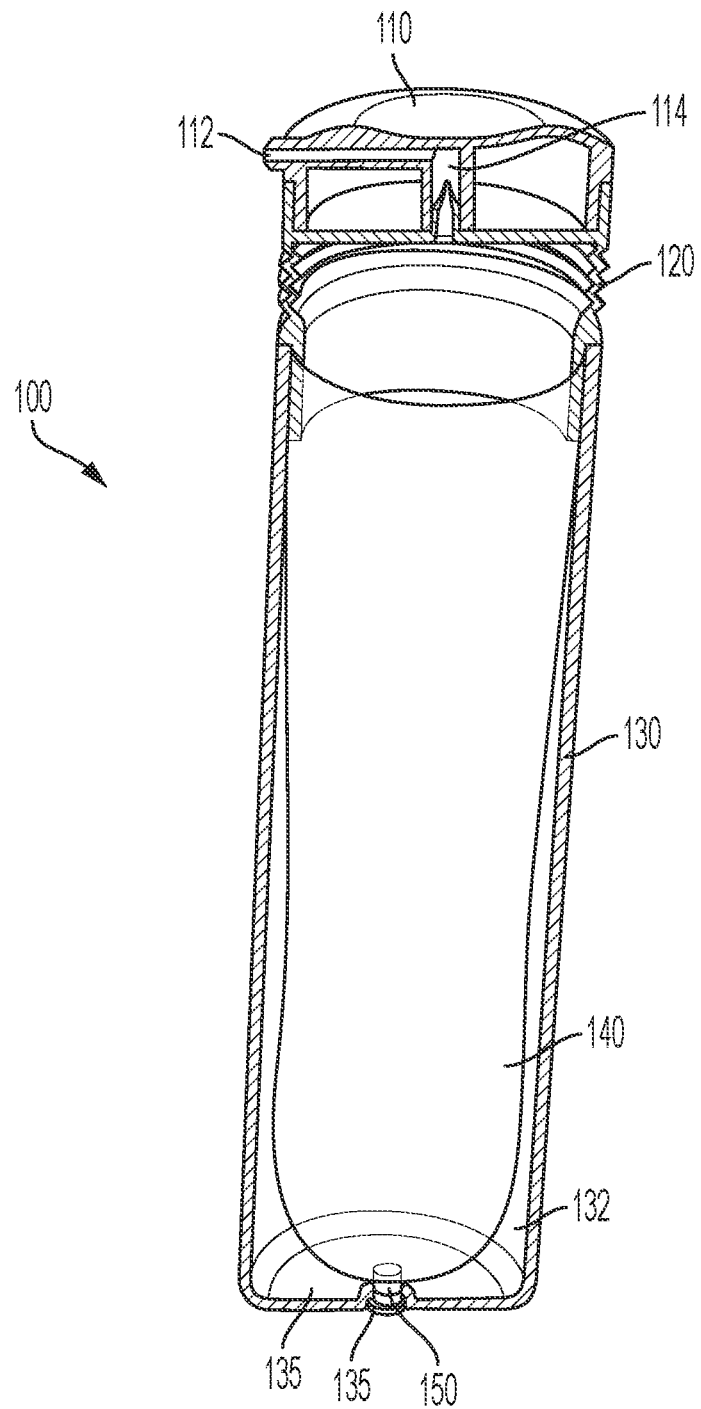
FIG. 4 is a cross-sectional view of the duckbill pump packaging of FIG. 1 comprising a bag.
Figure 4A:
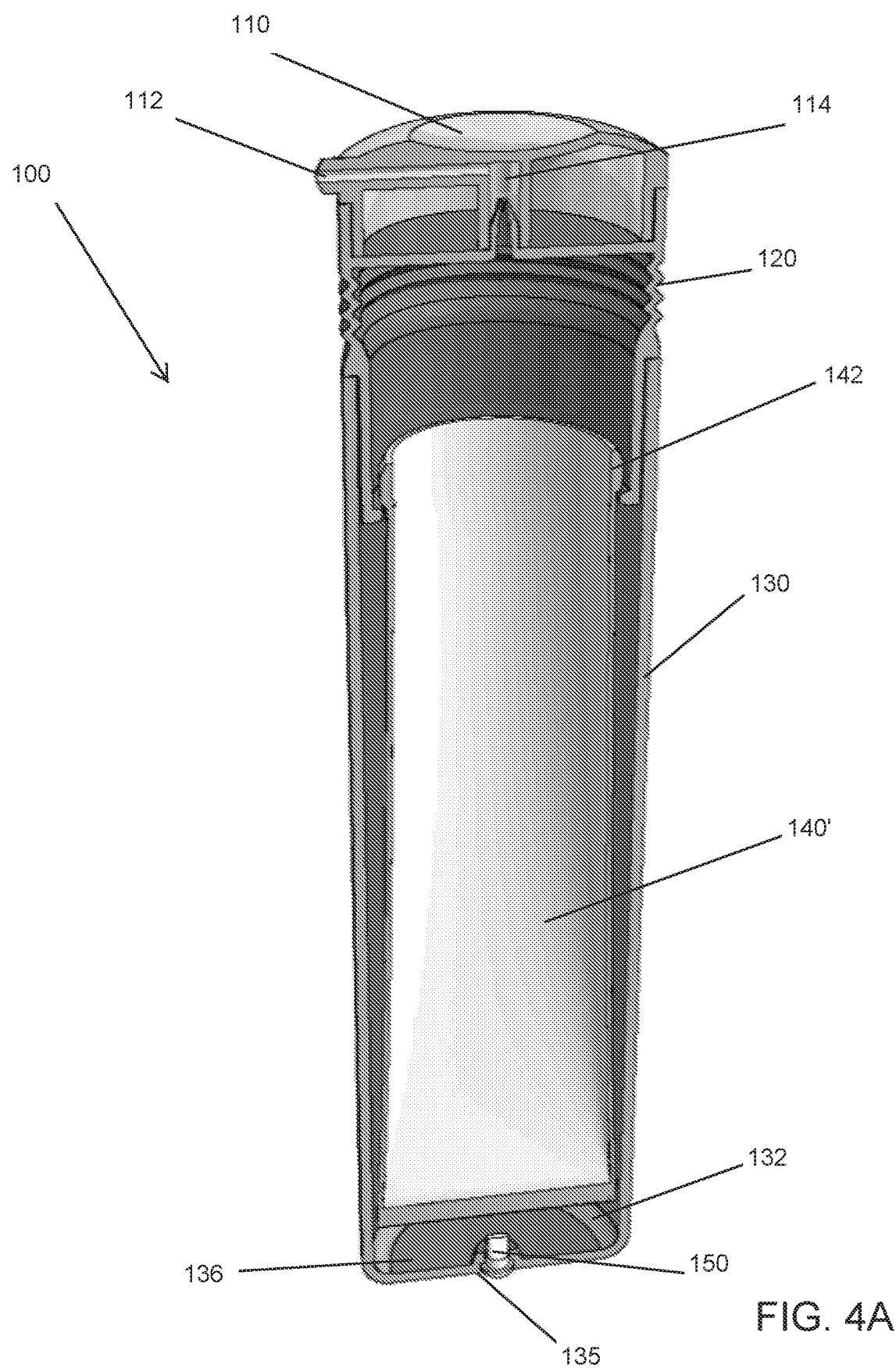
FIG. 4A is a cross-sectional view of the duckbill pump packaging of FIG. 1 comprising an extruded tube receptacle.
Figure 5:
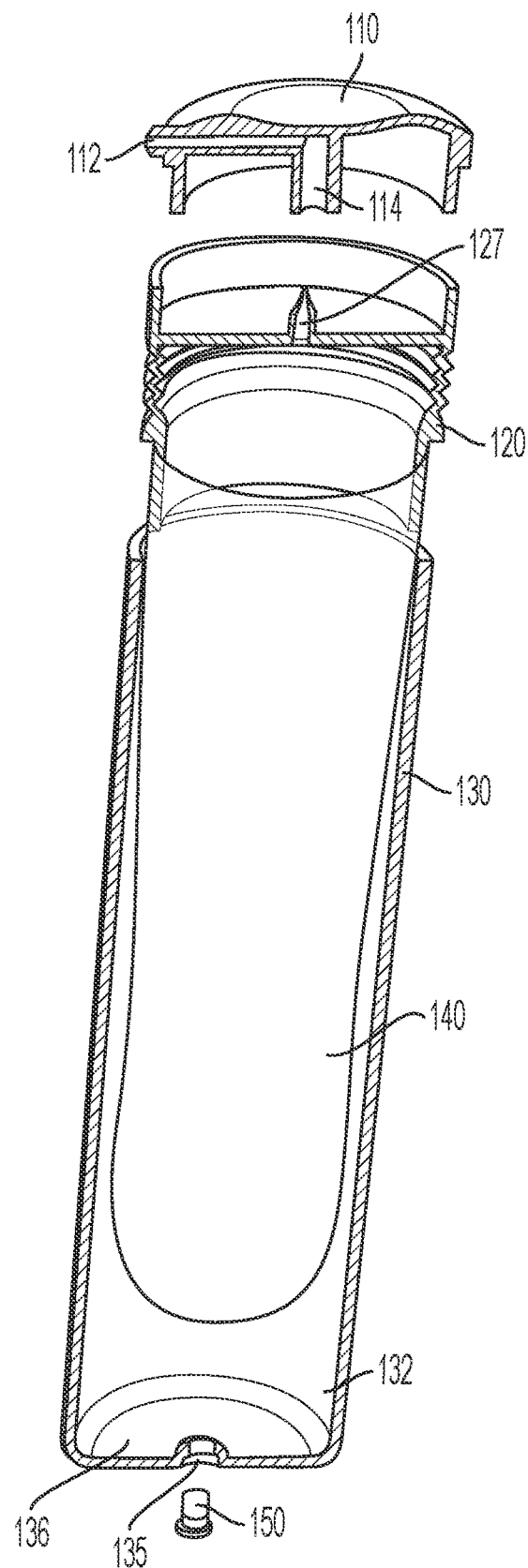
FIG. 5 is a cross-sectional view of the duckbill pump packaging of FIG. 1.
Figure 6:
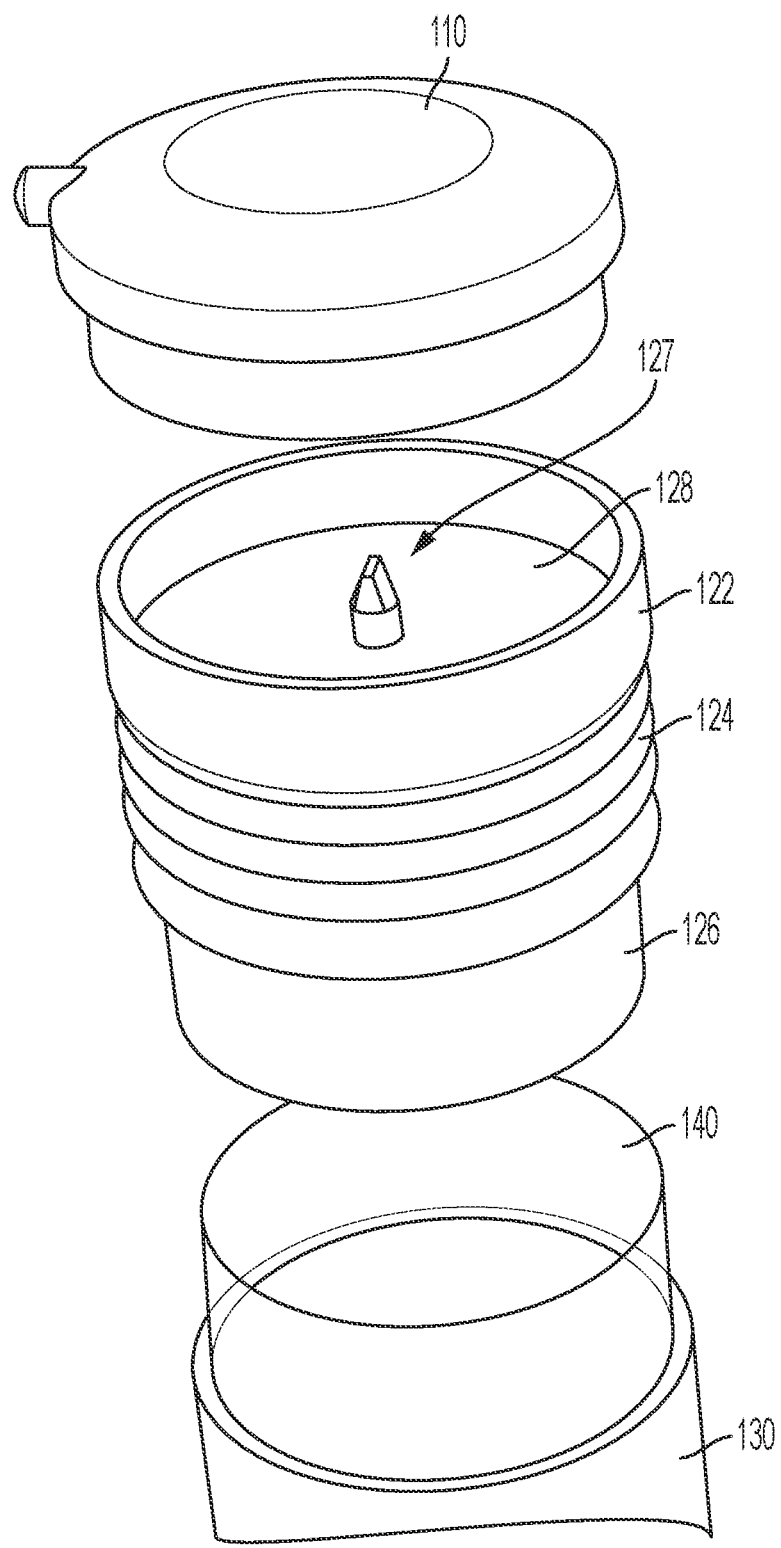
FIG. 6 is a partial perspective view of the duckbill pump packaging of FIG. 1.
Figure 7:
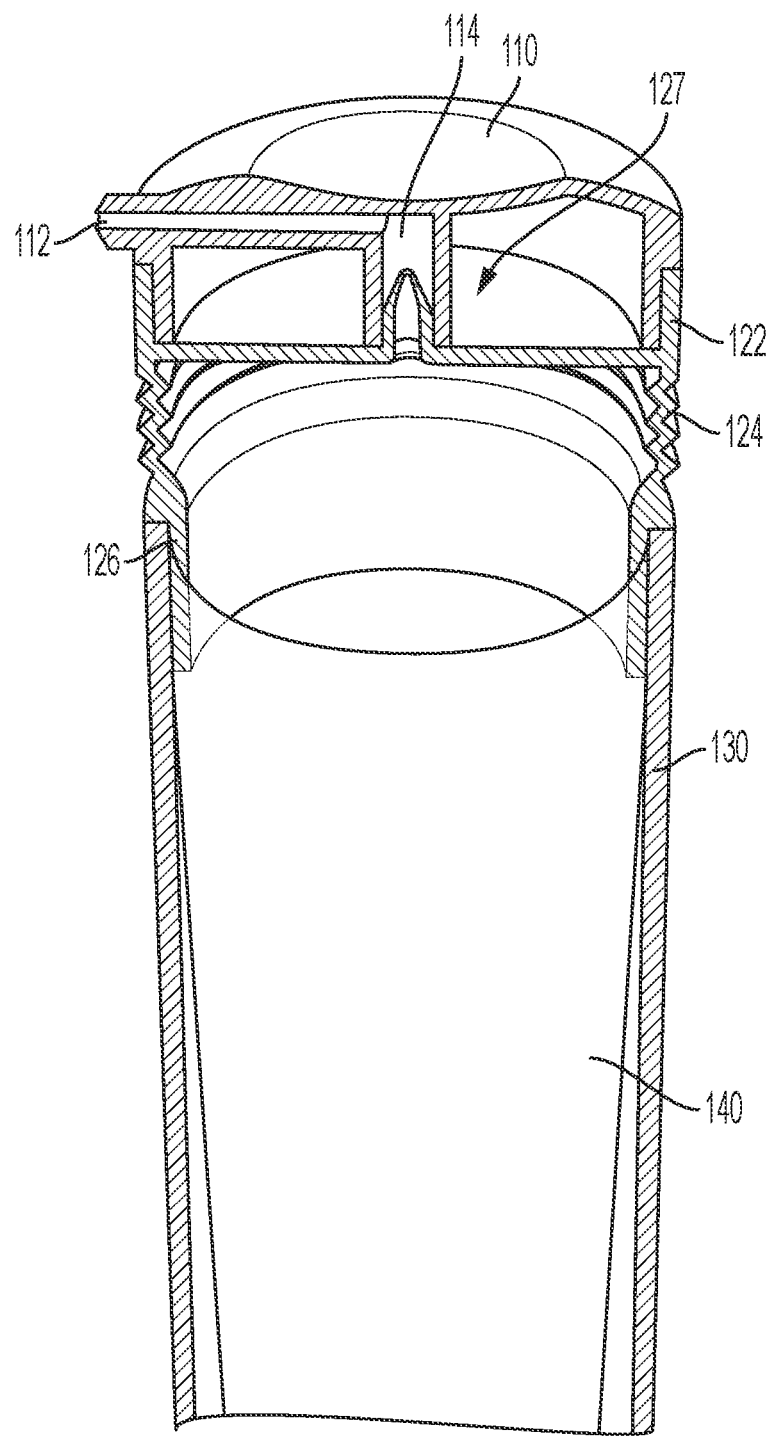
FIG. 7 is a partial cross-sectional view of the duckbill pump packaging of FIG. 1.
Figure 8:
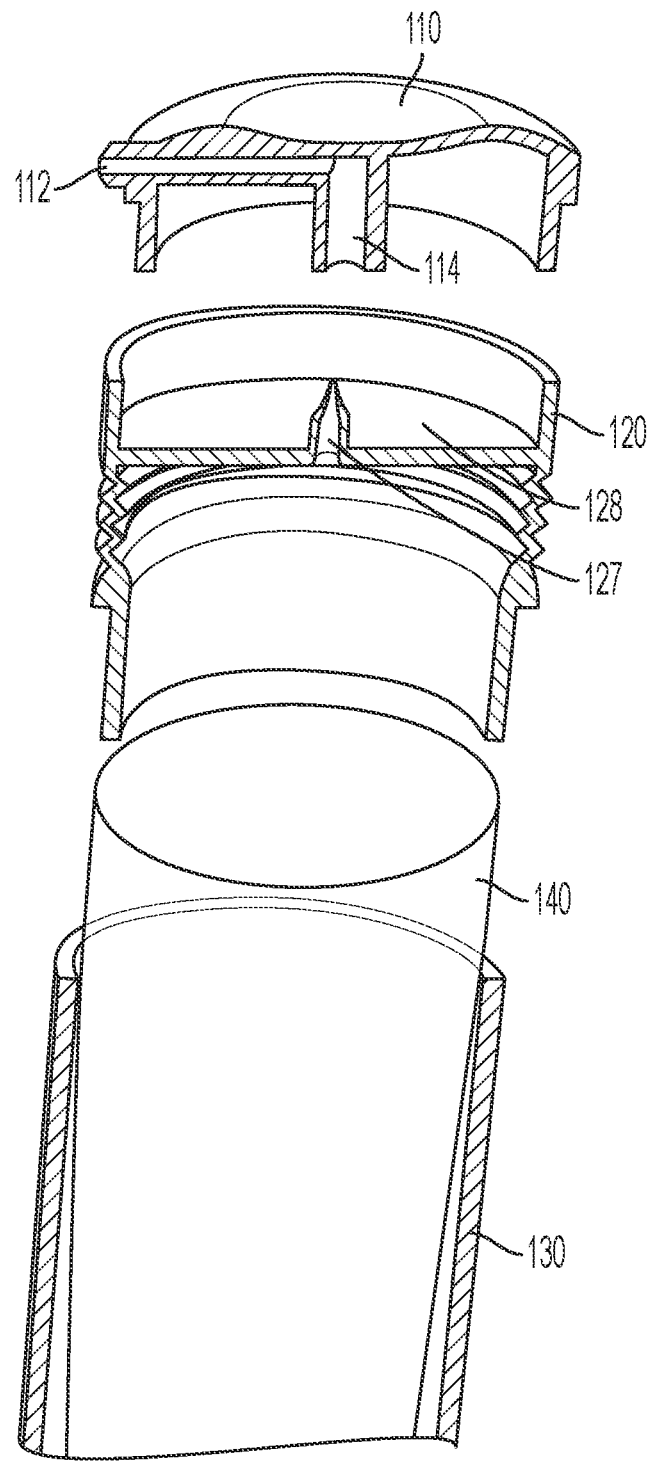
FIG. 8 is a partial cross-sectional view of the duckbill pump packaging of FIG. 1.

The second connection portion 126 is configured to form a connection between the intermediate connecting member 120 and the body 130. As shown in FIGS. 3-8, the second connection portion 126 is configured to be closely received within the body 130 in a press-fit and/or friction-fit manner. Stated another way, an outer circumference of the second connection portion 126 is sized to be closely received within an inner circumference of the body 130. In other instances, a connection between the body 130 and the second connection portion 126 can be formed by engagement between complementary grooves on the inner circumference of the body 130 and the outer circumference of the second connection portion 126. However, any suitable connection mechanism is envisioned. As shown in FIG. 7, at least a portion of the receptacle, or bag 140, is configured to be positioned between second connection portion 126 and the body 130. The portion of the bag 140 positioned in between the second connection portion 126 and the body 130 is trapped and/or held to a degree sufficient to hold and/or maintain the bag 140 in position regardless of the amount and/or weight of contents held within the bag 140. In various instances, as shown in FIG. 4A, an upper portion 142 of the receptacle 140' is configured to latch onto an inwardly-extending projection of the intermediate connecting member 120. In such instances, the receptacle 140' is not positioned between the body 130 and the intermediate connecting member 120. In various instances, an adhesive can be applied to the body 130 and/or the second connection portion 126 in an effort to reinforce the connection of the bag 140 therebetween.

One or more bellows 124 flexibly extend between the first connection portion 122 and the second connection portion 126. The one or more bellows 124 are formed from an elastic material. As discussed in greater detail herein, application of an input causes the one or more bellows 124 to move from a relaxed state to a compressed state. Once the input is no longer applied, or the input is insufficient to maintain and/or compress the one or more bellows 124, the one or more bellows 124 transition back to the relaxed state. The position of the one or more bellows 124 provides a user with visual feedback on the presence of and/or degree of an input being applied to the actuator 110.

In an effort to reduce a total number of components in the packaging 100, a duckbill valve 127 is integrally formed with the intermediate connecting member 120. However, other embodiments are envisioned where the duckbill valve 127 is an independent, discrete component. In such instances, the duckbill valve 127 can be press-fit into an opening defined within the intermediate connecting member 120, for example. As shown in FIG. 6, an interface 128 connects the duckbill valve 127 to sidewalls of the intermediate connecting member 120. As described in greater detail herein, the duckbill valve 127 facilitates the flow of the contents out of the body 130.

The actuator 110 comprises an opening 112 for the contents to be dispensed out of the packaging 100 and a channel 114 that forms a path between the duckbill valve 127 and the opening 112. When the actuator 110 is appropriately connected to the intermediate connecting member 120, the channel 114 is aligned with the duckbill valve 127. As shown in FIG. 7, the duckbill valve 127 is positioned within the channel 114. The walls of the channel 114 contact the interface 128 of the intermediate connecting member 128, thereby forming a seal around the duckbill valve 127. The seal prevents unwanted leakage of the fluid contents from the duckbill valve 127 outside of the channel 114. In various instances, the duckbill valve 127 is positioned entirely within the channel 114, and in other instances, the duckbill valve 127 is not positioned entirely within the channel 114.

Figure 9:
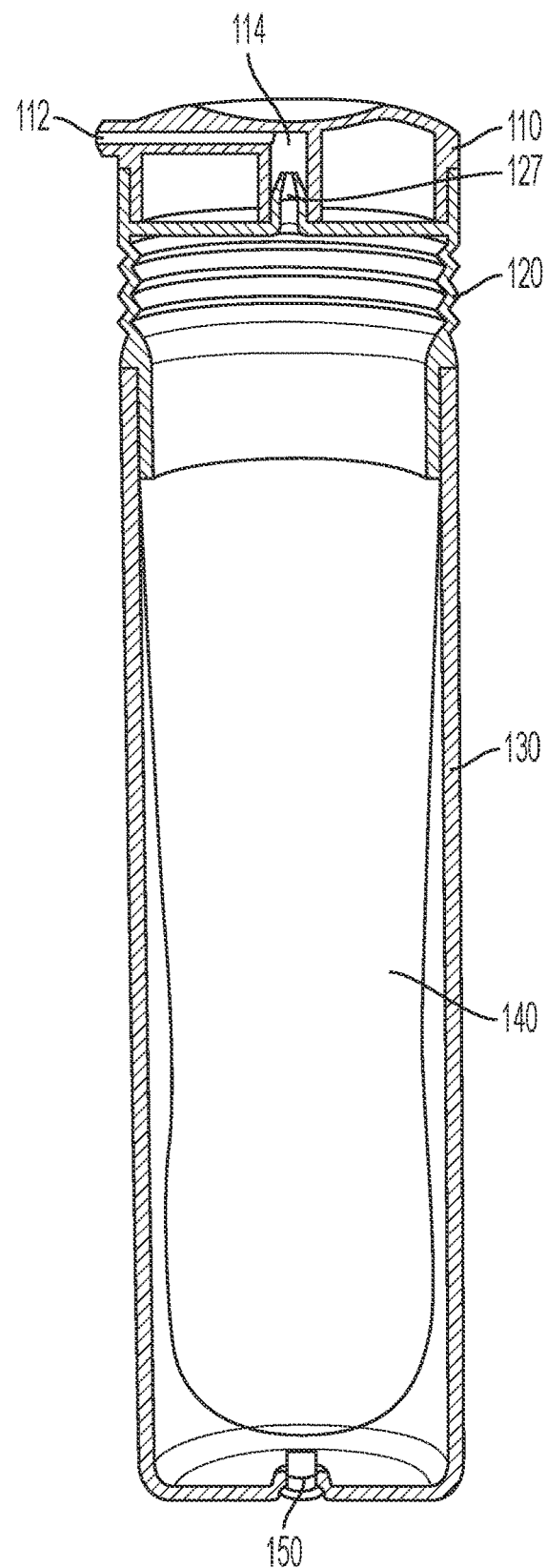
FIG. 9 is a cross-sectional view of the duckbill pump packaging of FIG. 1 in an assembled state.
Figure 10:
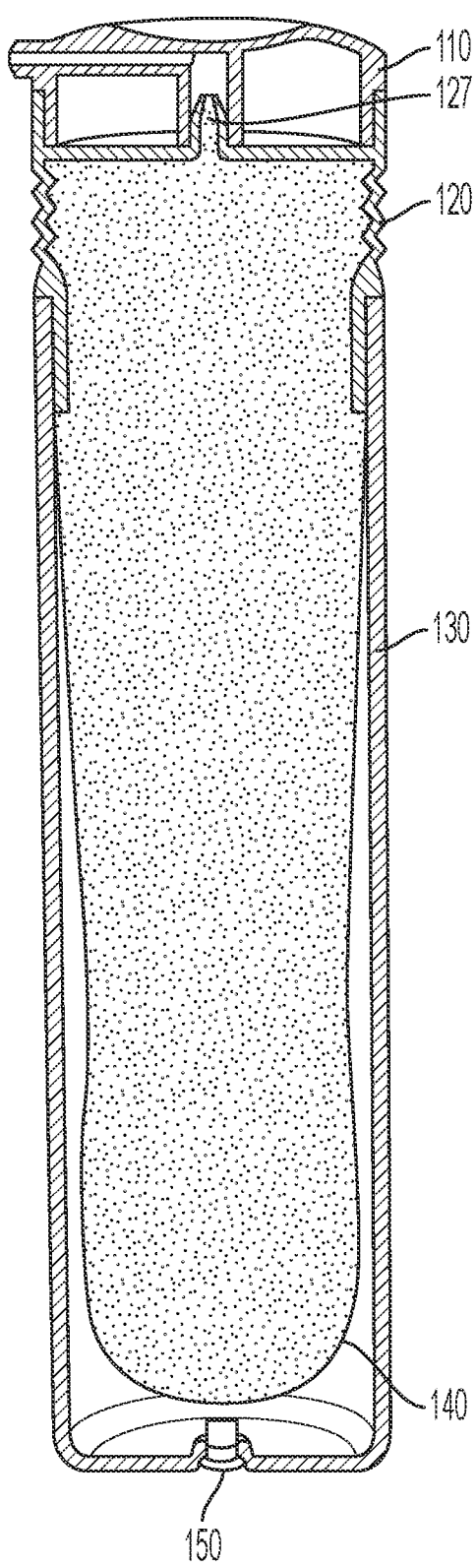
FIG. 10 is a cross-sectional view of the duckbill pump packaging of FIG. 9 illustrating fluid contents stored within the body and one or more bellows of the intermediate connecting member in a relaxed state.

FIG. 9 illustrates the packaging 100 in an assembled configuration. FIG. 10 illustrates the bag 140 of the packaging 100 filled with fluid contents. Upon receiving an input from a user, the actuator 110 delivers a metered dose of the contents out of the packaging 100. Stated another way, regardless of the force with which the user applies the input to the actuator 110, a pre-determined, standard amount of contents are dispensed from the packaging 100. In other instances, the actuator 110 can dispense an amount of contents that is proportional to the force applied to the actuator 110 by the user.

Figure 11:
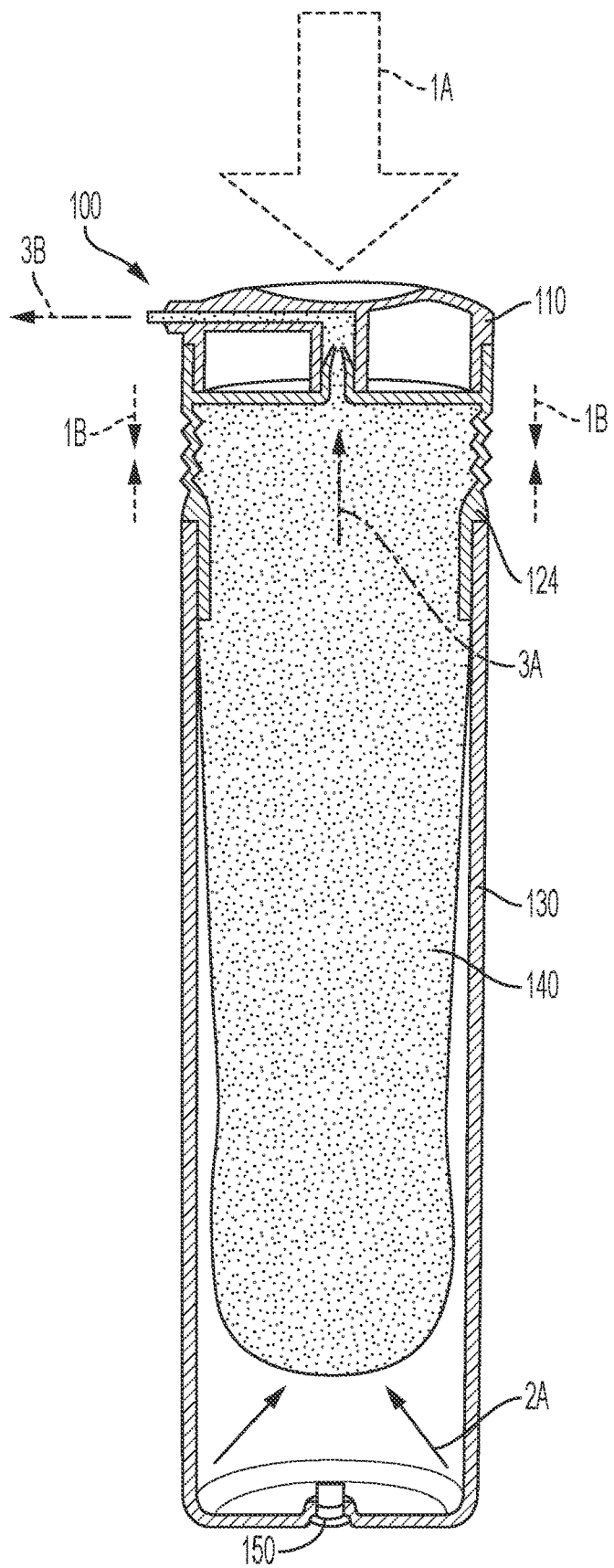
FIG. 11 is a cross-sectional view of the duckbill pump packaging of FIG. 10 as a user input is applied to the actuator, the one or more bellows are transitioned into a compressed state, and the fluid contents are dispensed from the packaging.
Figure 12:
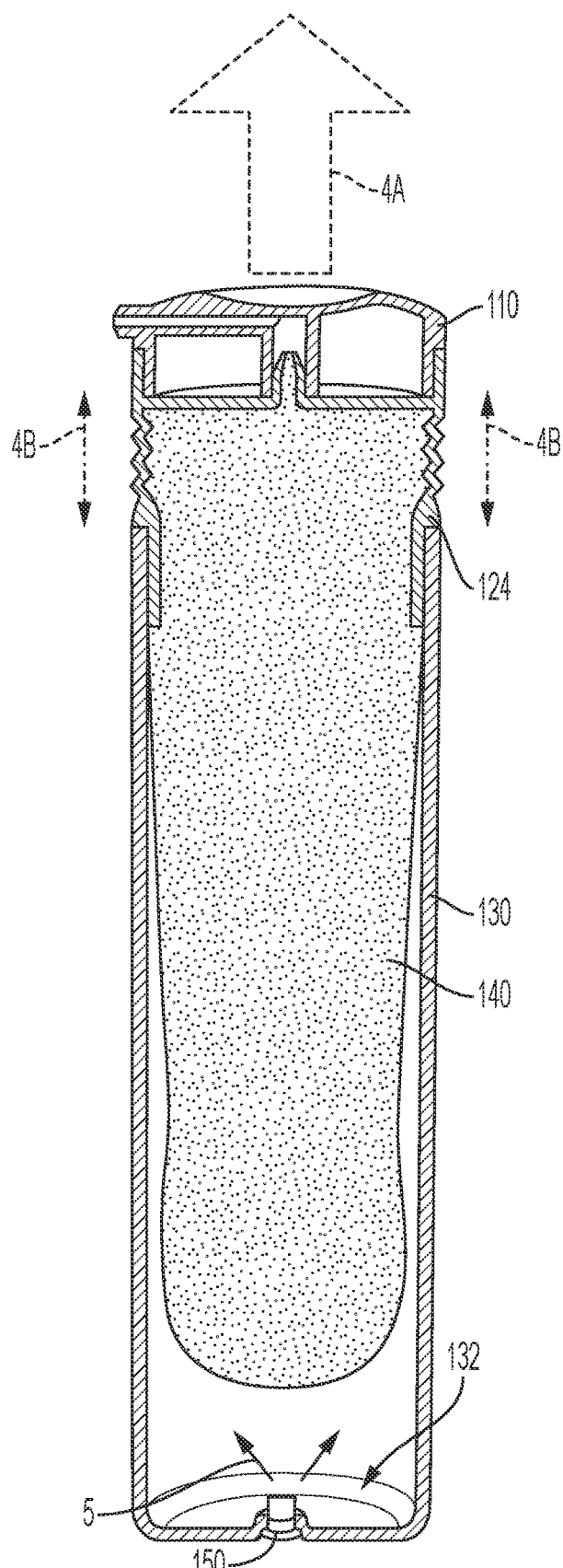
FIG. 12 is a cross-sectional view of the duckbill pump packaging of FIG. 11 after the fluid contents are dispensed from the packaging and the one or more bellows are transitioned from the compressed state toward the relaxed state.
Figure 13:
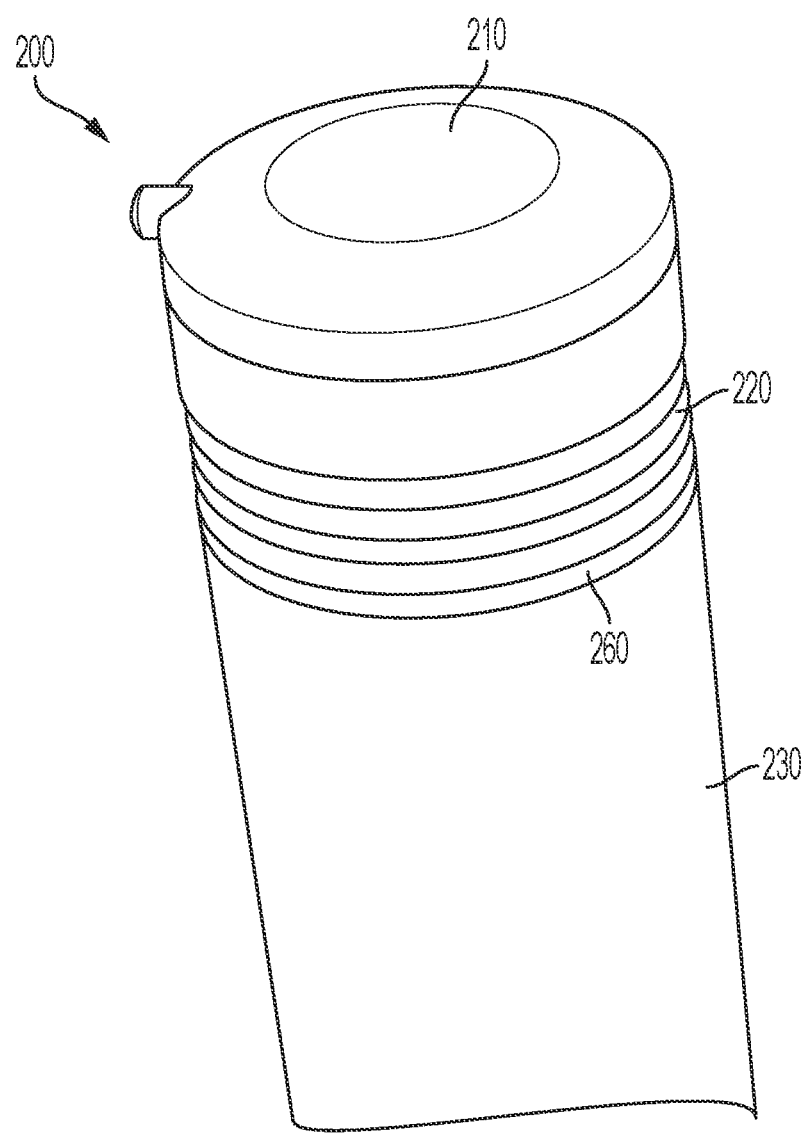
FIG. 13 is a partial perspective view of a refillable duckbill pump packaging in accordance with at least one embodiment of the present disclosure.
Figure 14:
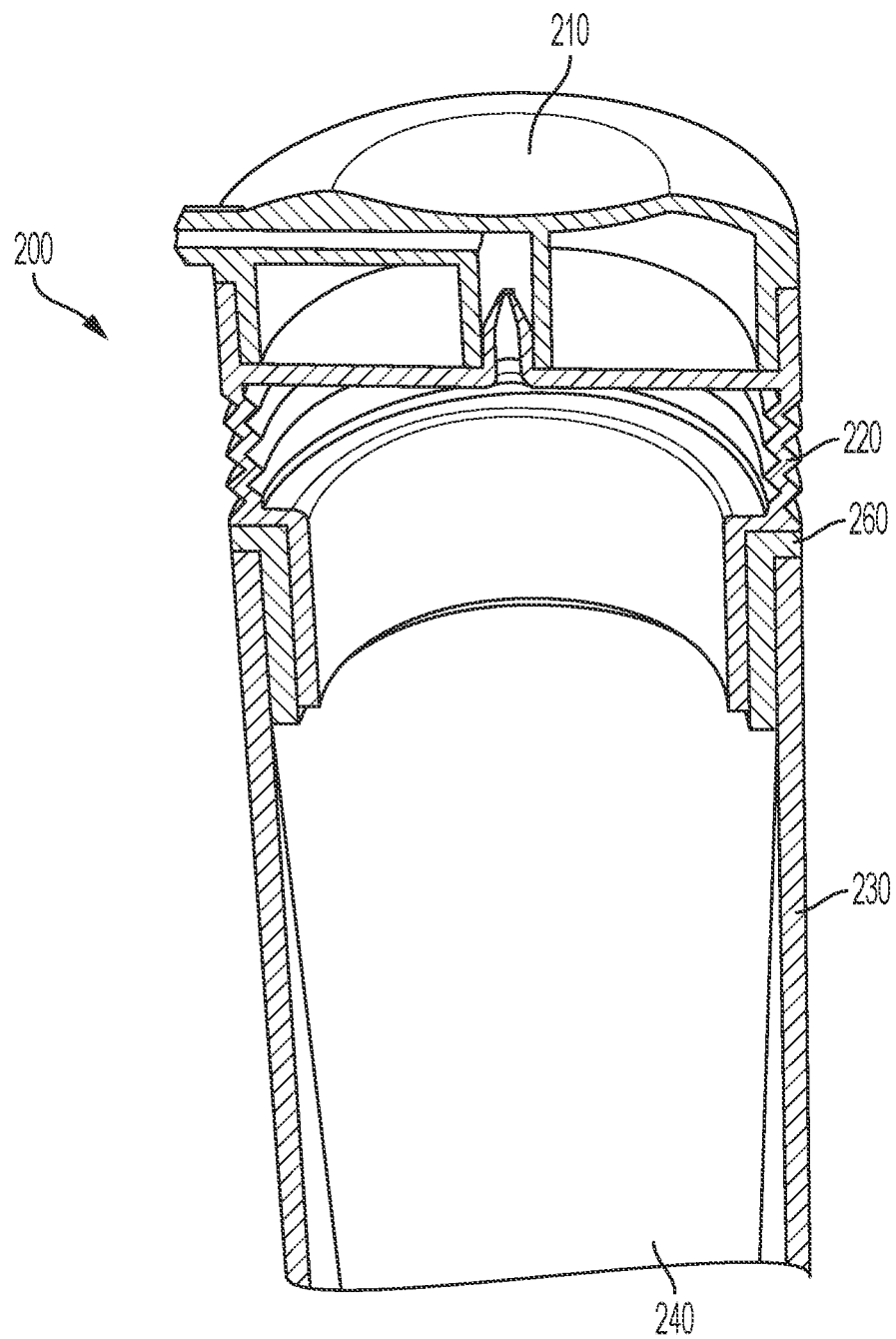
FIG. 14 is a partial cross-sectional view of the refillable duckbill pump packaging of FIG. 13.

The process of dispensing the fluid contents out of the packaging 100 is illustrated in detail in FIGS. 11 and 12. Represented by arrow 1A, a user applies an input, such as a downward force, to the actuator 110 of the packaging 100. The input is sufficient to cause the contents of the packaging 100 to begin dispensing when the one or more bellows 124 move from the relaxed state to the compressed state, represented by arrows 1B. Arrow 2 illustrates the air pressure within the reservoir 132 of the body 130 collapsing the bag 140 inward. As the bag 140 begins to collapse, the fluid contents are pushed upward 3A toward the duckbill valve 127. The pressure of the fluid contents being pushed upward motivates the duckbill valve 127 open, thereby allowing the fluid contents to flow into the channel 114 of the actuator 110 and out of the opening 112. The flow of the fluid contents out of the opening 112 is represented by arrow 3A.

Referring now to FIG. 12, arrow 4A represents when a user is no longer applying an input to the actuator, or when the input is not sufficient to further compress the one or more bellows 124. At such time, the one or more bellows 124 move from the compressed stated to the relaxed state, represented by arrow 4B. At such time, the duckbill valve is closed, and fluid is no longer able to flow out of the bag 140 and into the channel 114. As the one or more bellows 124 return to the relaxed state, air is drawn into the reservoir 132 of the body 130 through the one-way valve 150, represented by arrow 5. Such a process repeats until fluid contents are no longer stored within the bag 140.

In an effort to enhance the sustainability and/or reduce waste of packaging, a packaging 200 comprising a refillable bag is illustrated in FIGS. 13-16. The components and the functionality packaging 200 are similar in many respects to the packaging 100 described above. For example, the packaging 200 comprises an actuator 210, an intermediate connecting member 220, and a body 230. The packaging 200 further comprises a bag 240 configured to be refilled. The refillable feature of the bag 240 of the packaging 200 allows for the same packaging 200 to be reused for an lengthened duration of time.

Figure 15:
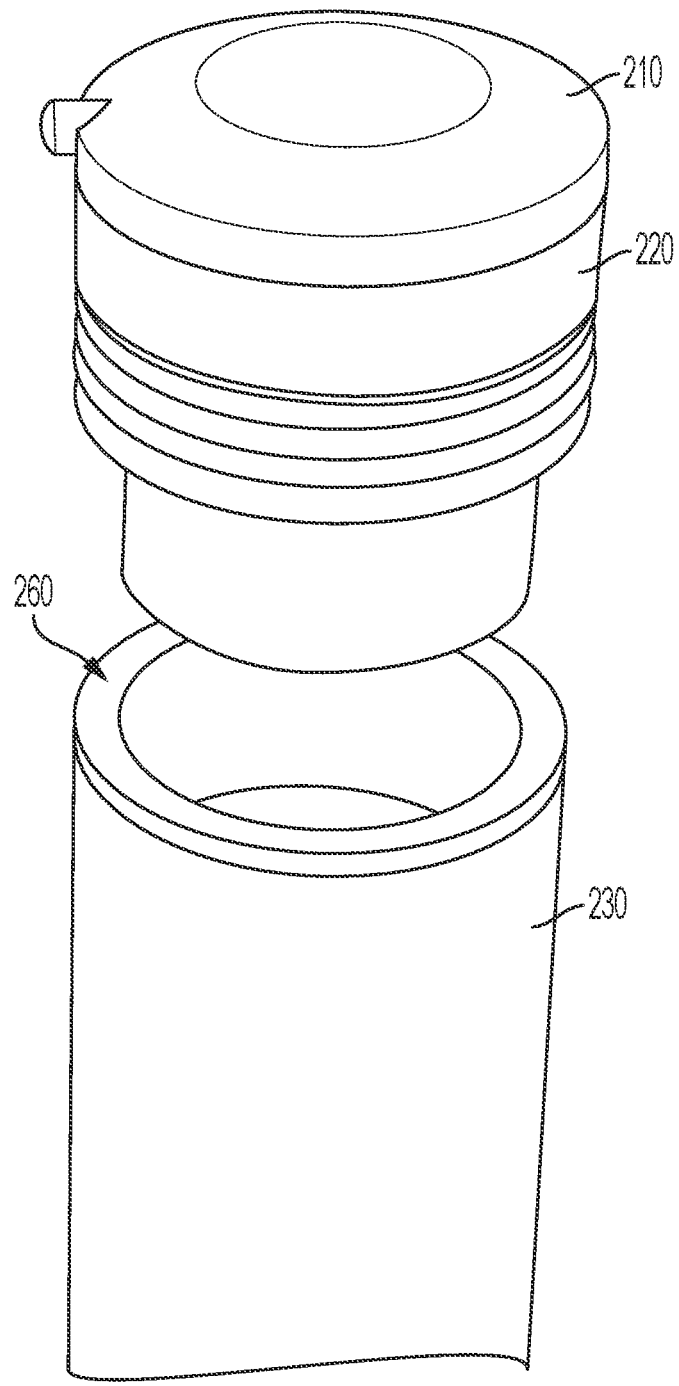
FIG. 15 is a partial exploded view of the refillable duckbill pump packaging of FIG. 13.
Figure 16:
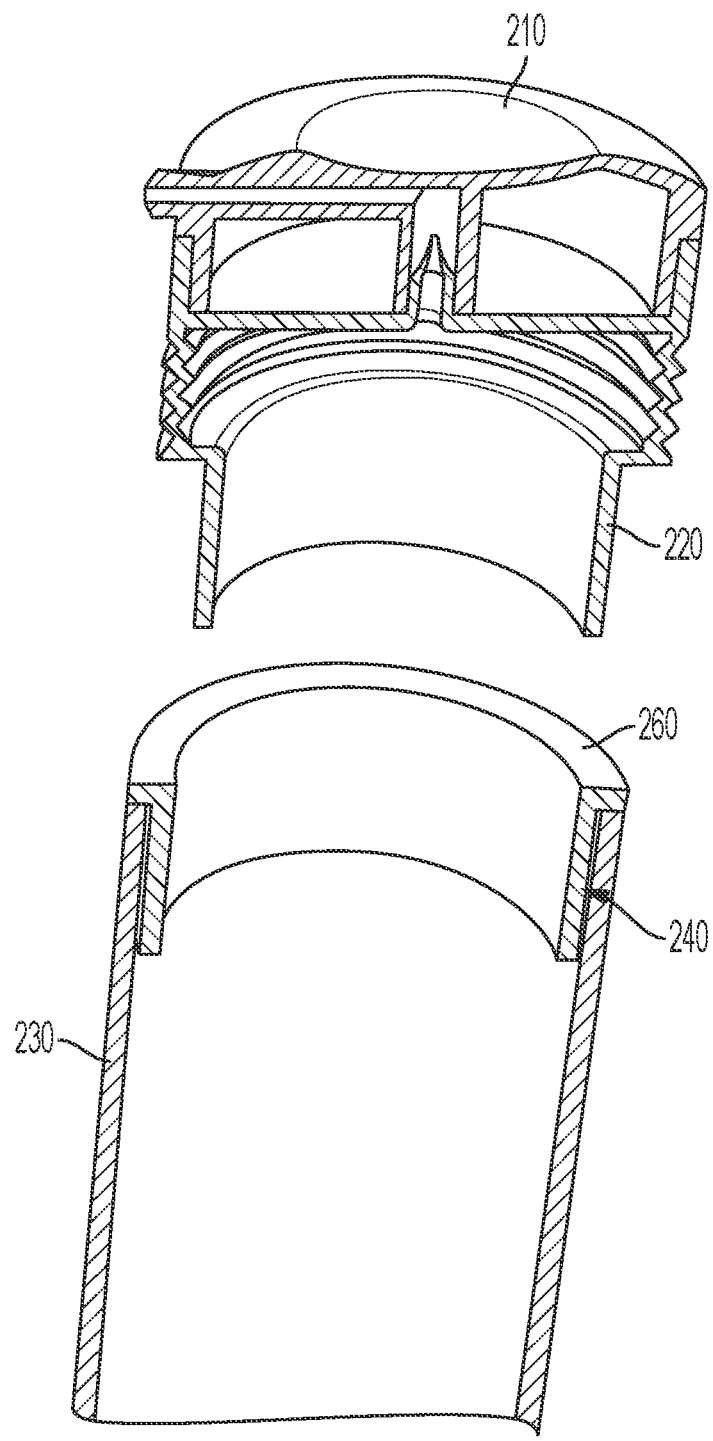
FIG. 16 is a partial cross-sectional view of the refillable duckbill pump packaging of FIG. 13.

As shown in FIG. 15, the packaging 200 further comprises a rigid plug 260 to reinforce the position of bag 240 in comparison to packaging 100. Packaging 100 relies on the engagement between the second connection portion 126 of the intermediate connecting member 120 and the body 130 to maintain the bag 140 in position. The addition of the rigid plug 260 in packaging 200 secures the bag 240 in an upright position regardless of the connection between the intermediate connecting member 220 and the body 230. The rigid plug 260 can be comprised of any suitable material, including plastic and/or metal, for example. The bag 240 is configured to be affixed to the rigid plug 260 in any suitable manner. In various instances, the bag 240 is integrally formed with the rigid plug 260. In other instances, the bag 240 is sized to fit around a portion of the rigid plug 260. In such instances, a seal is formed between the bag 240 and an outer circumference of the rigid plug 260 to prevent unwanted leakage of the fluid contents. The bag 240 is further bolstered in the upright position as the rigid plug 260 is press-fit between the wall 230 and the intermediate connecting member 220. IN various instances, an adhesive layer is used to attach the rigid plug 260 to the wall 230. In any event, the bag 240 is not intended to be removed from the rigid plug 260.

Figure 17:
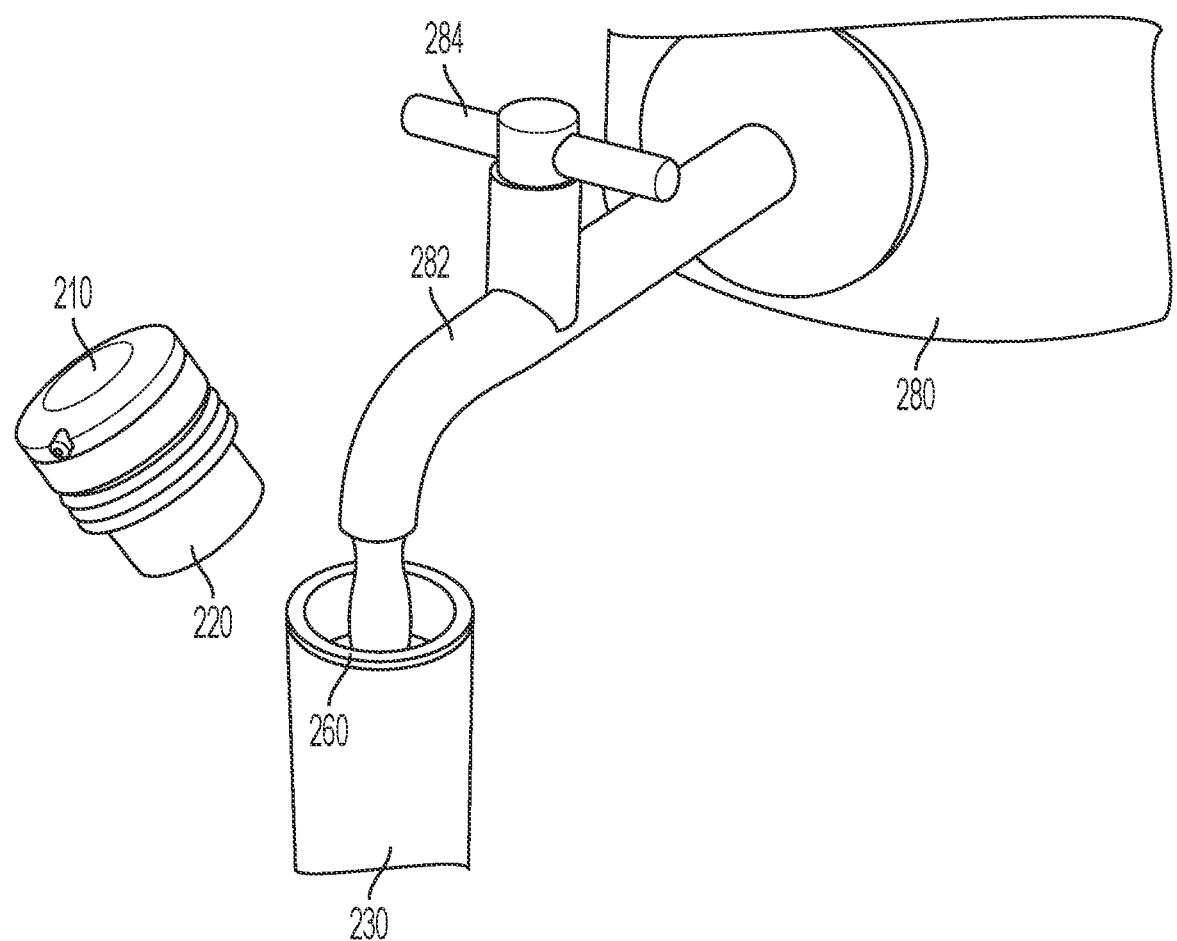
FIG. 17 is a partial perspective view of the duckbill pump packaging of FIG. 13 being refilled.

The packaging 200 is not intended to be refilled by a user. Instead, the packaging 200 is intended to be refilled by a clerk in a store such as a department store, for example. However, any person with access to the desired contents is able to refill the packaging 200. As shown in FIG. 17, the actuator 210 and the intermediate connecting member 220 are detached and/or disassociated from the body 230 of the packaging 200. Notably, the rigid plug 260 and the bag 240 remain positioned within the body 230. A container 280 storing fluid contents comprises a nozzle 282 and a valve 284. Upon placement of the body 230 underneath the nozzle 282 of the container 280, the valve 284 is opened to permit the fluid contents to flow out of the container 280 and into the bag 240 of the packaging 200. In various instances, the nozzle 282 is used to motivate and/or maintain the bag 240 in an open configuration during the refilling process. After the packaging 200 is refilled, the actuator 210 and the intermediate connecting member 220 are reattached to the body 230. The bag 240 is configured to be refilled any suitable number of times. As the packaging 200 is continuously used, mechanical failure of one or more components is possible. In such instances, a new packaging 200 is needed. However, while not infinite, the reusability of the packaging 200 significantly contributes to a sustainability initiative.

In various instances, the valve 284 of the container 280 is manual. The manual valve 284 requires a user to turn the valve 284 off after a desired amount of fluid contents are dispensed into the bag 240. In other instances, the container 280 comprises an automated functionality that permits a user to input the desired amount of fluid contents to be dispensed into the bag 240. The desired amount can be specifically identified by the user and/or the container 280 can determine an appropriate about of fluid contents to dispense based on an identified packaging size.

Figure 18:
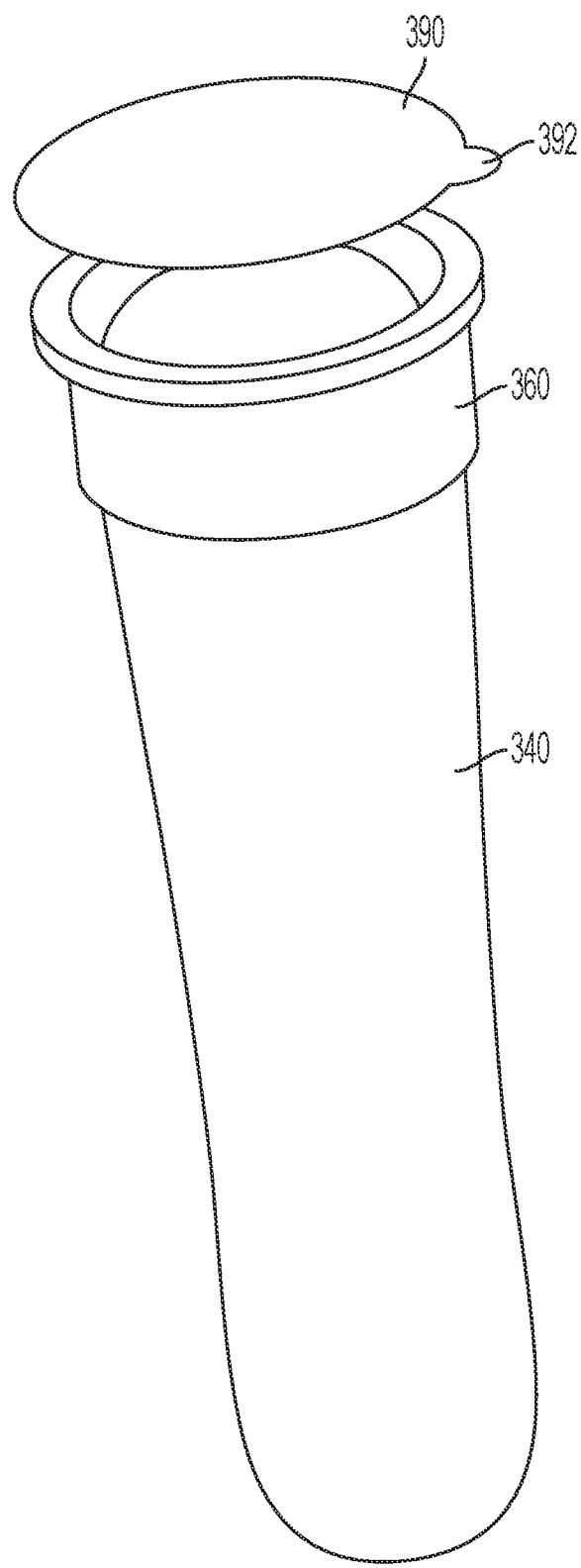
FIG. 18 is an exploded view of a replaceable bag for use with a duckbill pump packaging in accordance with at least one embodiment of the present disclosure.
Figure 18A:
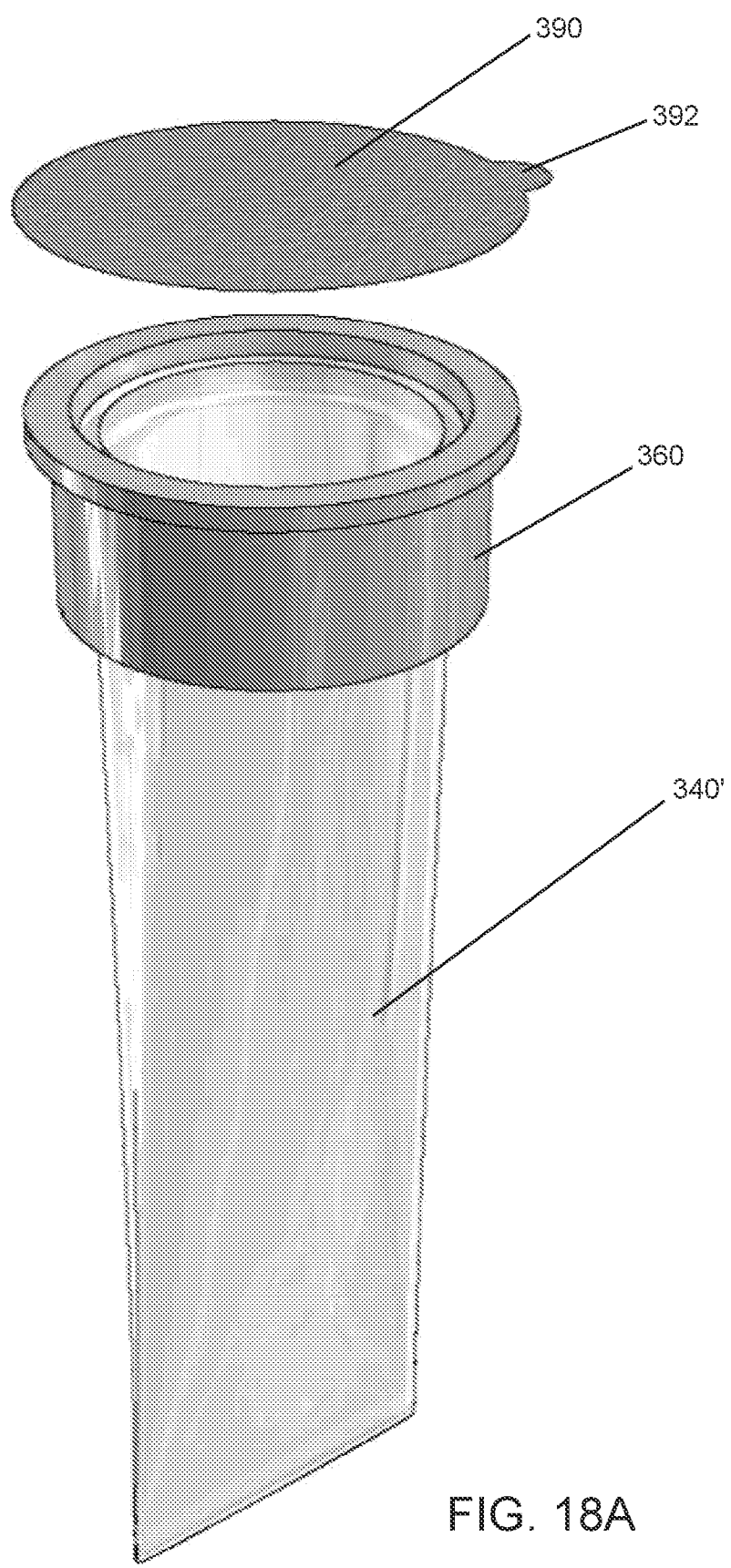
FIG. 18A is an exploded view of a receptacle for use with a duckbill pump packaging in accordance with at least one embodiment of the present disclosure.
Figure 19:
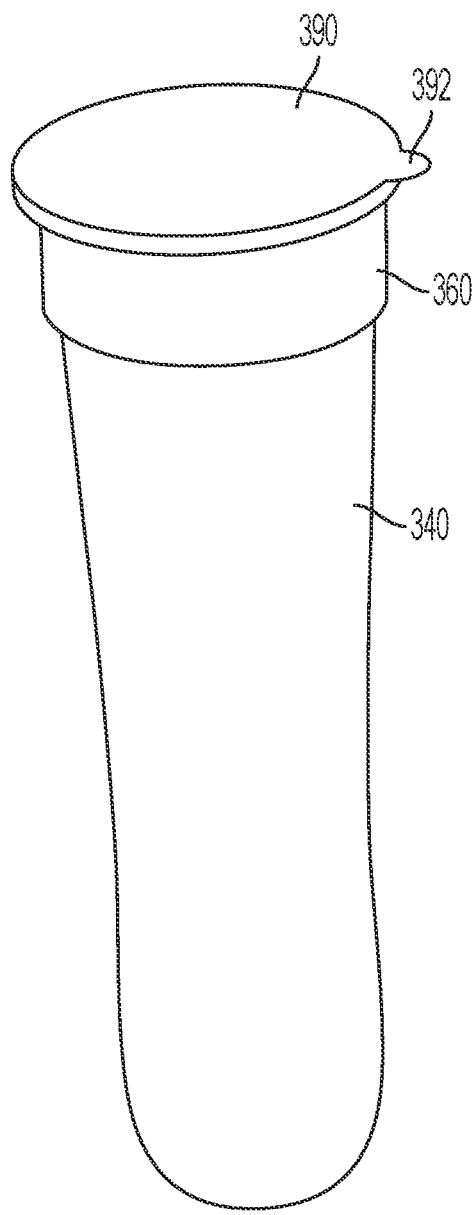
FIG. 19 is a perspective view of the replaceable bag of FIG. 18.
Figure 19A:
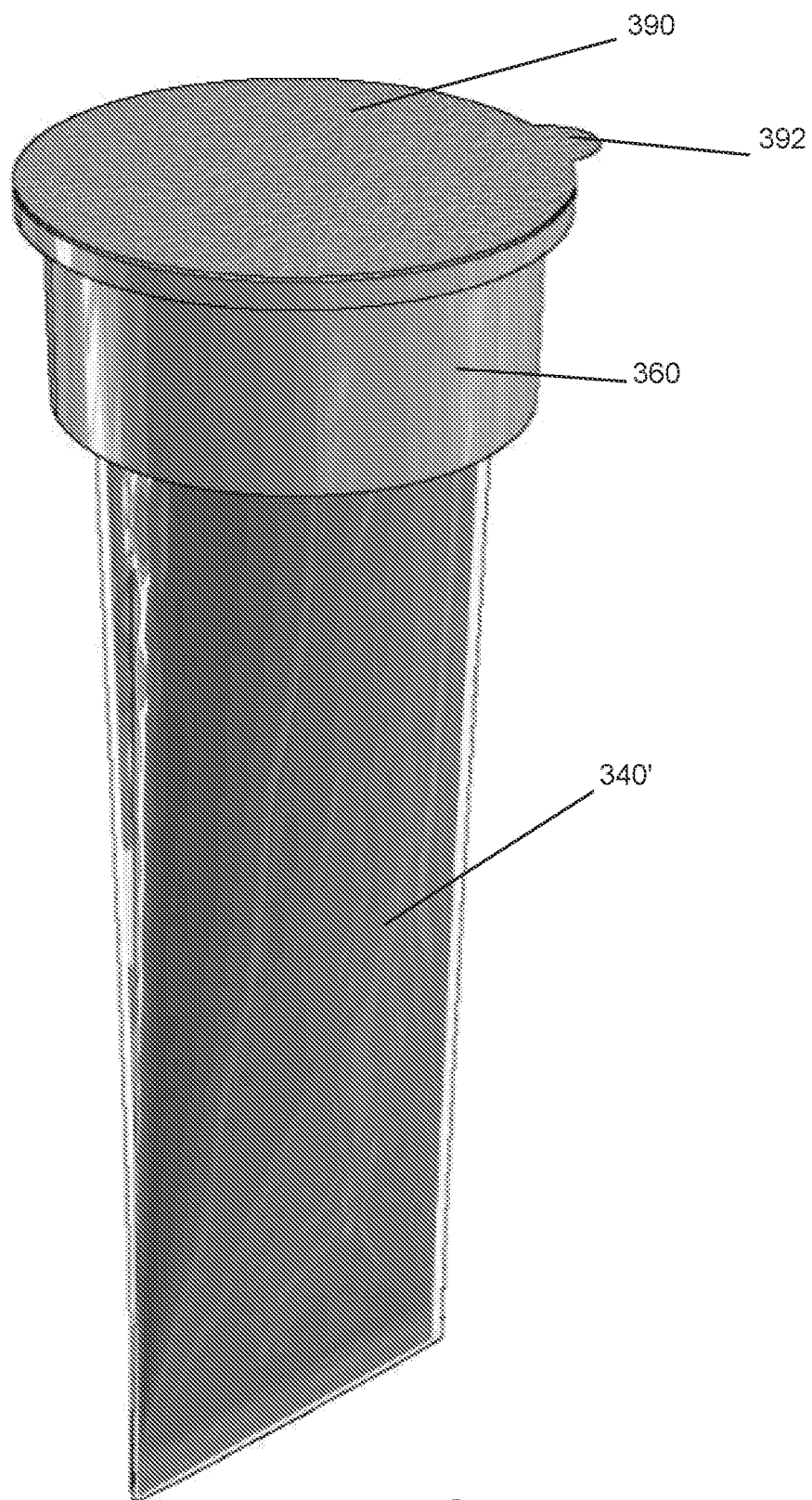
FIG. 19A is a perspective view of the receptacle of FIG. 18A.
Figure 20:
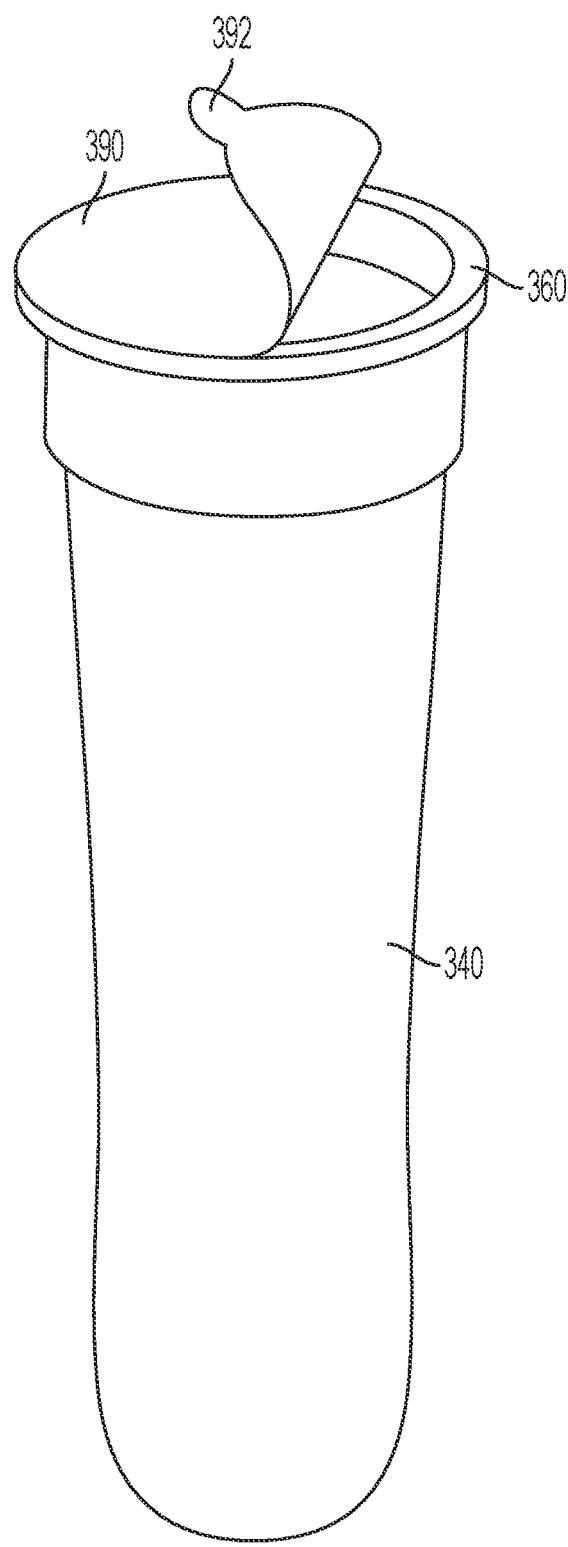
FIG. 20 is a perspective view of the replaceable bag of FIG. 18 comprising an open seal.

FIGS. 18-25 illustrate a replaceable bag, or receptacle, 340, 340' for use with a duckbill valve packaging 300. In various instances, as shown in FIGS. 18A, 19A, and 23A, the receptacle 340' comprises an extruded tube. In such instances, the extruded tube can be a thin-walled extruded tube. The packaging 300 is similar in many respects to packaging 100, 200 described above. The receptacle 340, 340' is shipped to and/or purchased by the user pre-filled with fluid contents. Stated another way, the receptacle 340, 340' comprises fluid contents stored therein prior to attachment of the receptacle 340, 340' to the packaging 300. The ability for a user to replace individual bags 340 reduces the user's need to purchase an entirely new packaging and/or to travel to a store for the contents of the packaging to be refilled. The bag 340 is similar in many respects to the bags 140, 240 in composition and functionality. The replaceable bag 340 comprises a rigid plug 360, similar to rigid plug 260, attached thereto that facilitates attachment of the replaceable bag 340 to a body 330 of a packaging 300. The replaceable bag 340 is attached to the rigid plug 360 in any suitable manner. For example, the rigid plug 360 can be integrally formed with the bag 340. In other instances, the replaceable bag 340 is secured to the rigid plug 360 using an adhesive. In any event, the replaceable bag 340 and the rigid plug 360 are not intended to be separated, or otherwise disassociated, from one another.

A foil layer 390 is pressed on top of the rigid plug 360 to create a seal and/or barrier that prevents the contents of the bag 340 from leaking. In various instances, an adhesive layer is deposited on the rigid plug 360 prior to placement of the foil layer 390 thereon to strengthen the seal. While the layer 390 depicted in FIGS. 17-25 is comprised of foil, any suitable material can be used. The layer 390 comprises a tab 392 that extends beyond the circumference of the rigid plug 360. The tab 392 allows a user to easily grab a portion of the layer 390 to remove the layer 390 from the rigid plug 360 of the bag 340.

Figure 21:
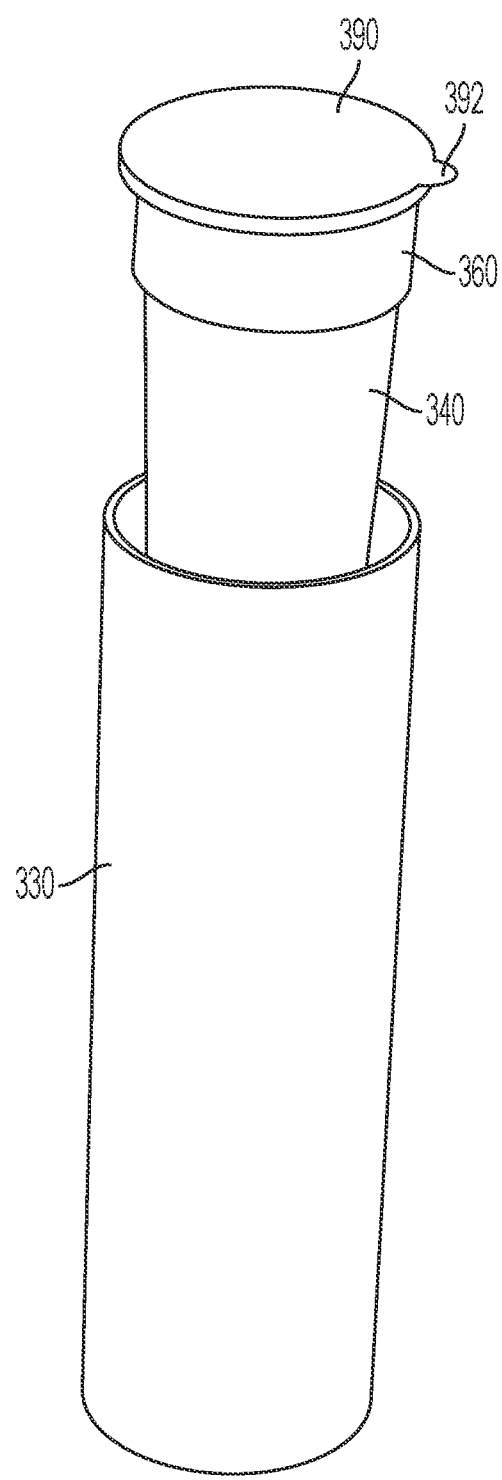
FIG. 21 is a partial perspective view of the replaceable bag of FIG. 18 being inserted into the duckbill pump packaging.
Figure 22:
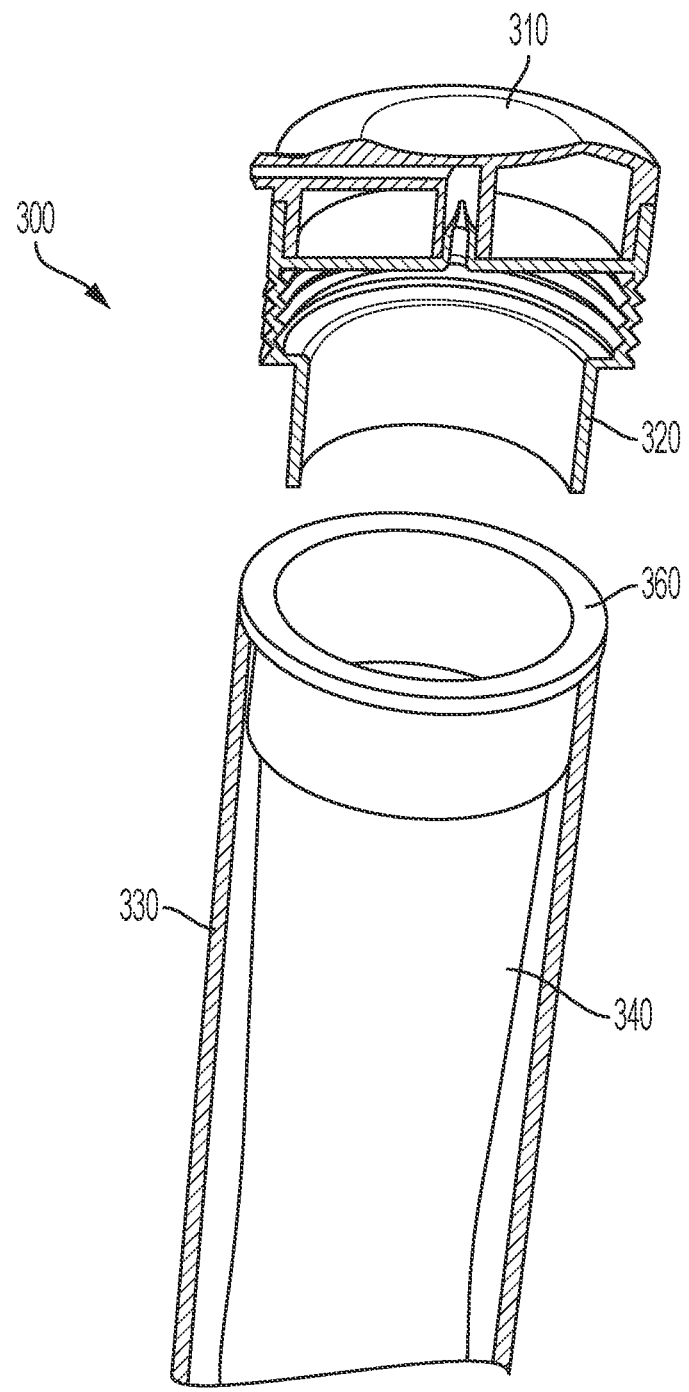
FIG. 22 is a partial cross-sectional view of the replaceable bag inserted in the duckbill pump packaging of FIG. 21.
Figure 23:
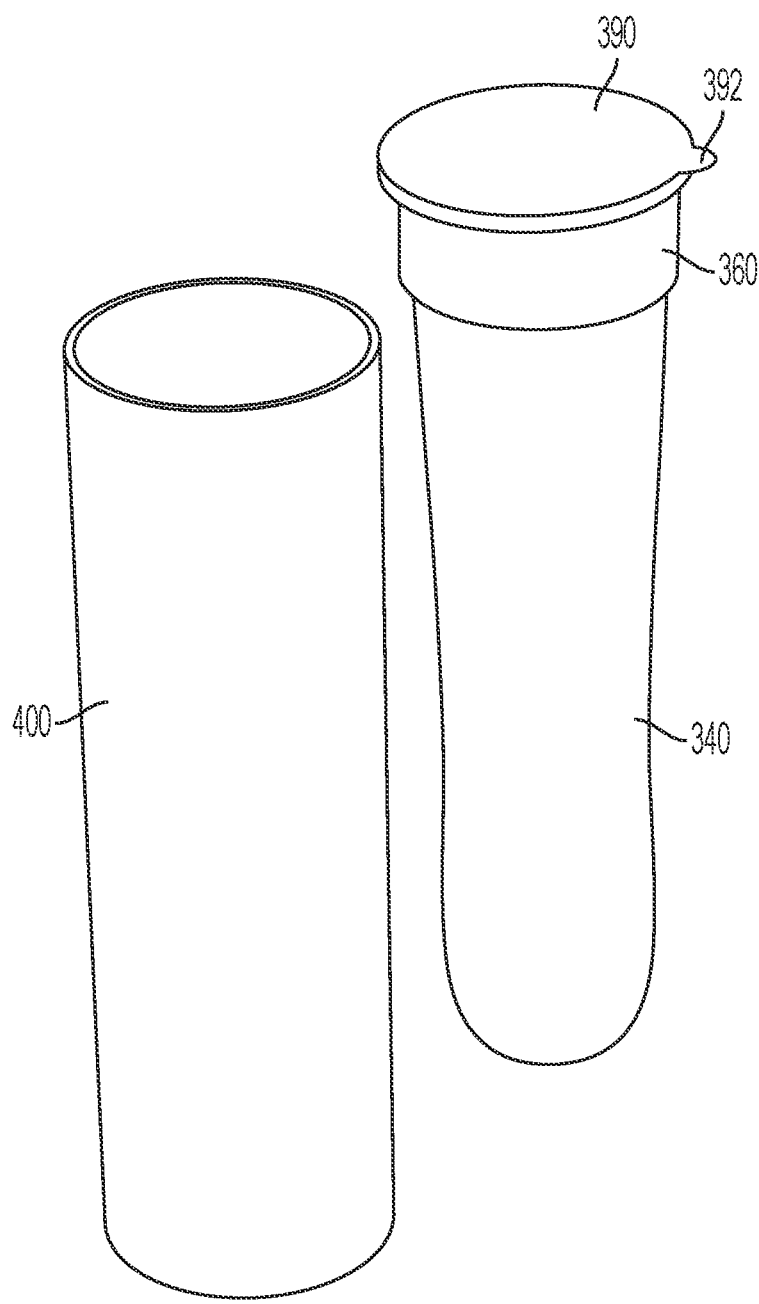
FIG. 23 is a perspective view of the replaceable bag of FIG. 18 within a storage container in accordance with at least one embodiment of the present disclosure.
Figure 23A:
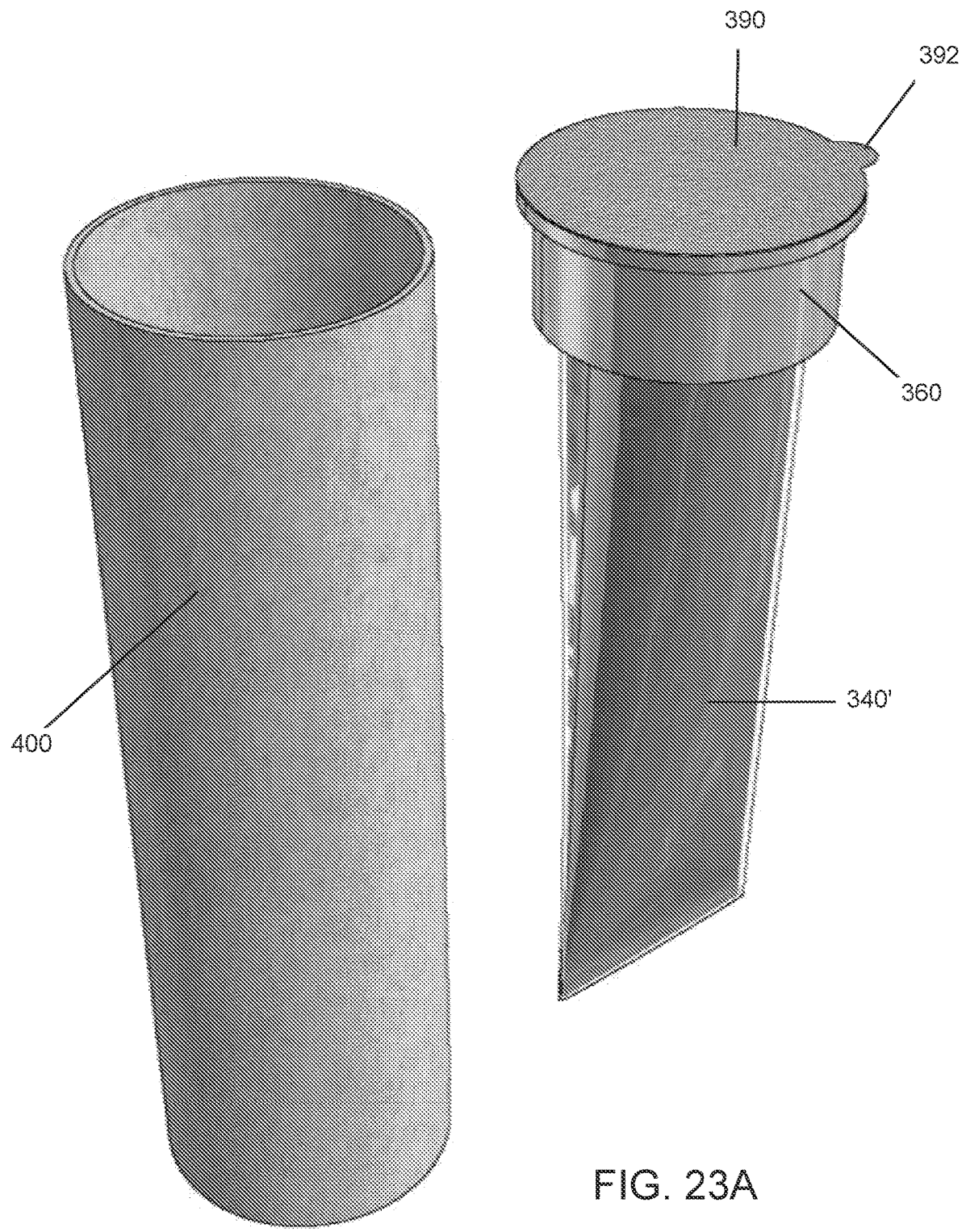
FIG. 23A is a perspective view of the receptacle of FIG. 18A within a storage container in accordance with at least one embodiment of the present disclosure.
Figure 24:
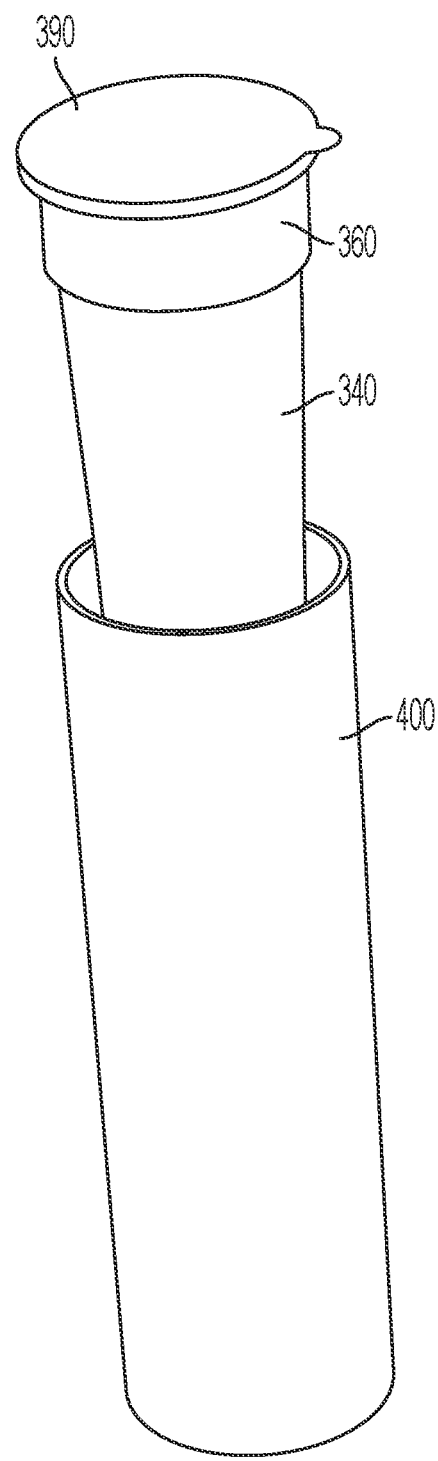
FIG. 24 is an exploded view of the replaceable bag and the storage container of FIG. 23.

Referring now to FIGS. 21 and 22, the replaceable bag 340 is intended to be attached to the body 330 of the packaging 300 with the foil layer 390 intact to avoid spilling and/or contamination of the fluid contents. The replaceable bag 340 is configured to be press-fit into the body 330. As shown in FIG. 22, a portion of the rigid plug 360 interfaces with and sits on a top surface of the body 330. In various instances, an adhesive layer is deposited on the top surface of the body 330 to enhance the connection between the rigid plug 360 and the body 330. Once the replaceable bag 340 is seated in the body 330, a user can remove foil layer 390 by peeling back the tab 392. In various instances, an intermediate connecting member 320 and/or an actuator 310 can comprise a sharp edge configured to puncture the foil layer 390 upon assembly of the packaging 300. In such instances, the foil layer 390 is pushed out of the way so as to not inhibit the contents from flowing out of the replaceable bag 340.

Figure 25:
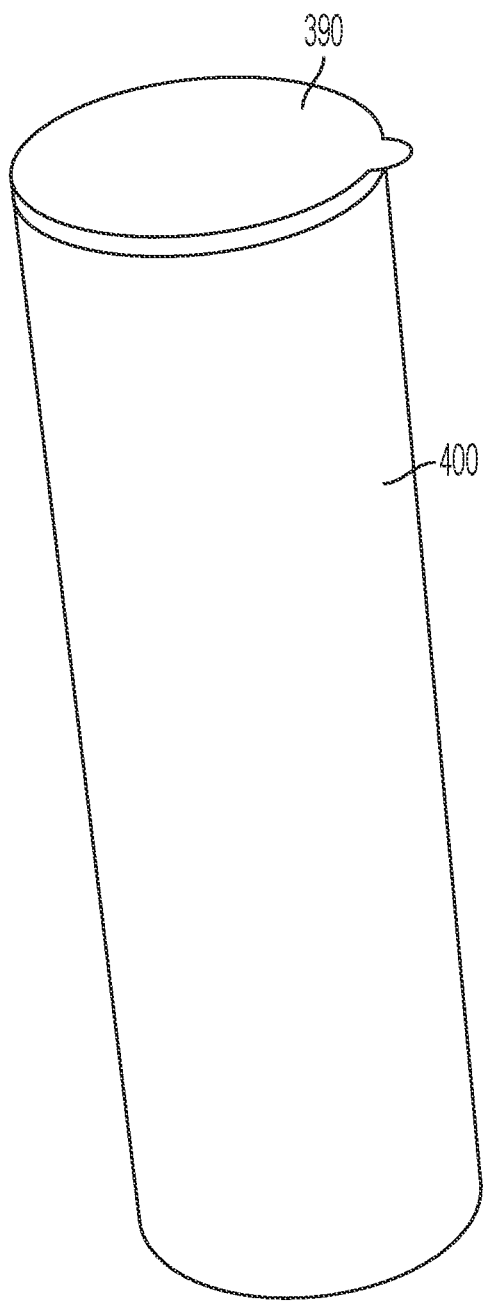
FIG. 25 is a perspective view of the replaceable bag and the storage container of FIG. 23.
Figure 26:
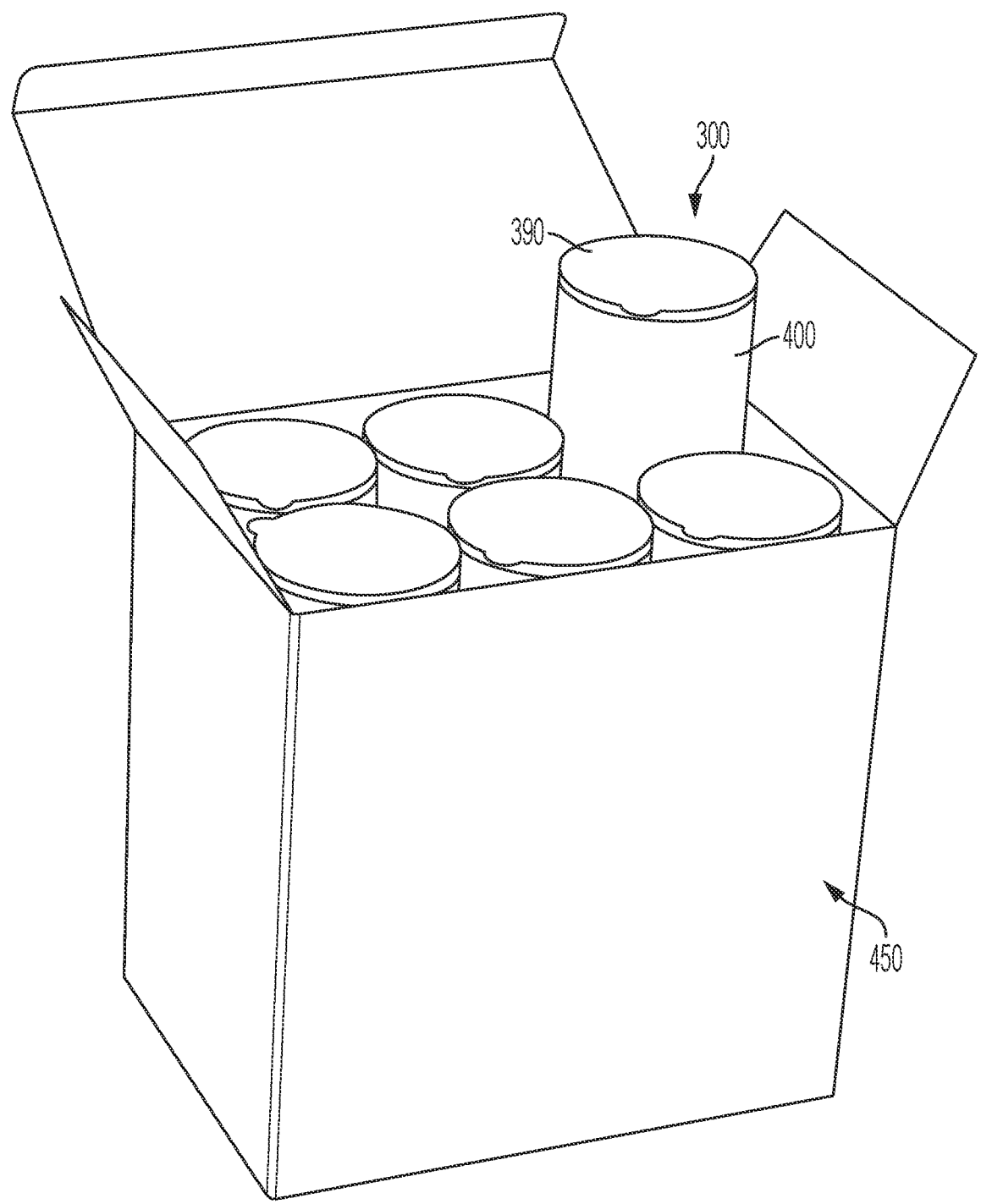
FIG. 26 is a perspective view of numerous storage containers of FIG. 25 within a shipping container in accordance with at least one embodiment of the present disclosure.
Figure 27:
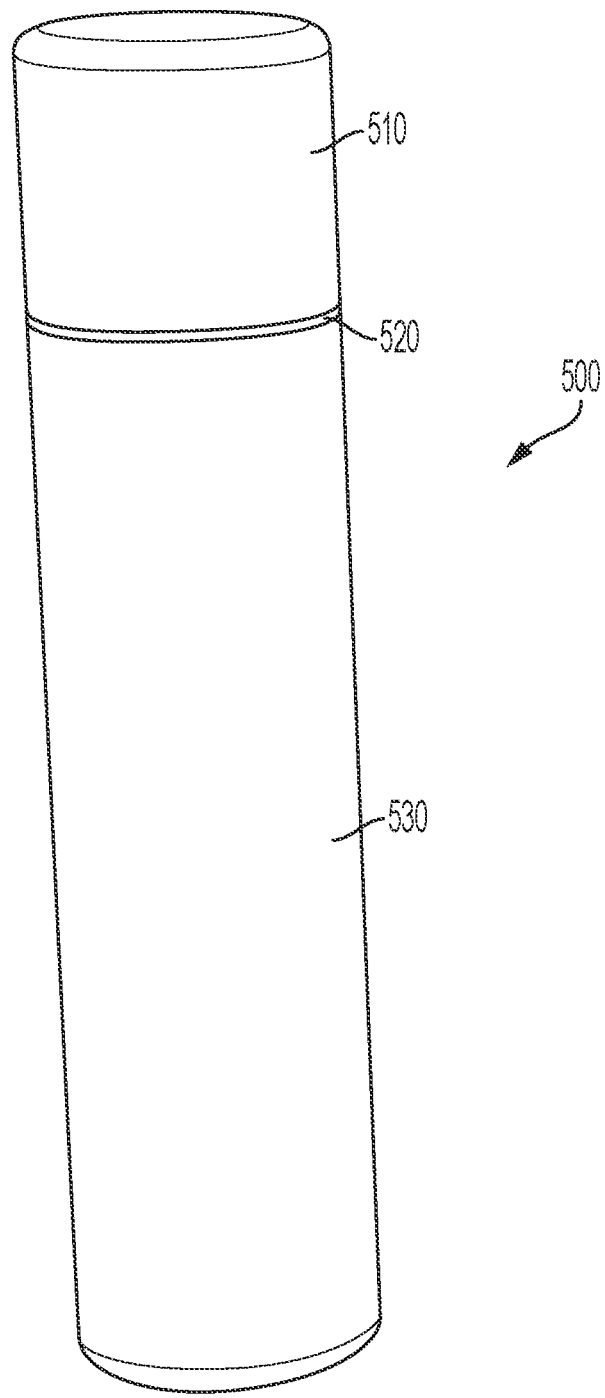
FIG. 27 is a perspective view of a packaging in accordance with at least one embodiment of the present disclosure.
Figure 28:
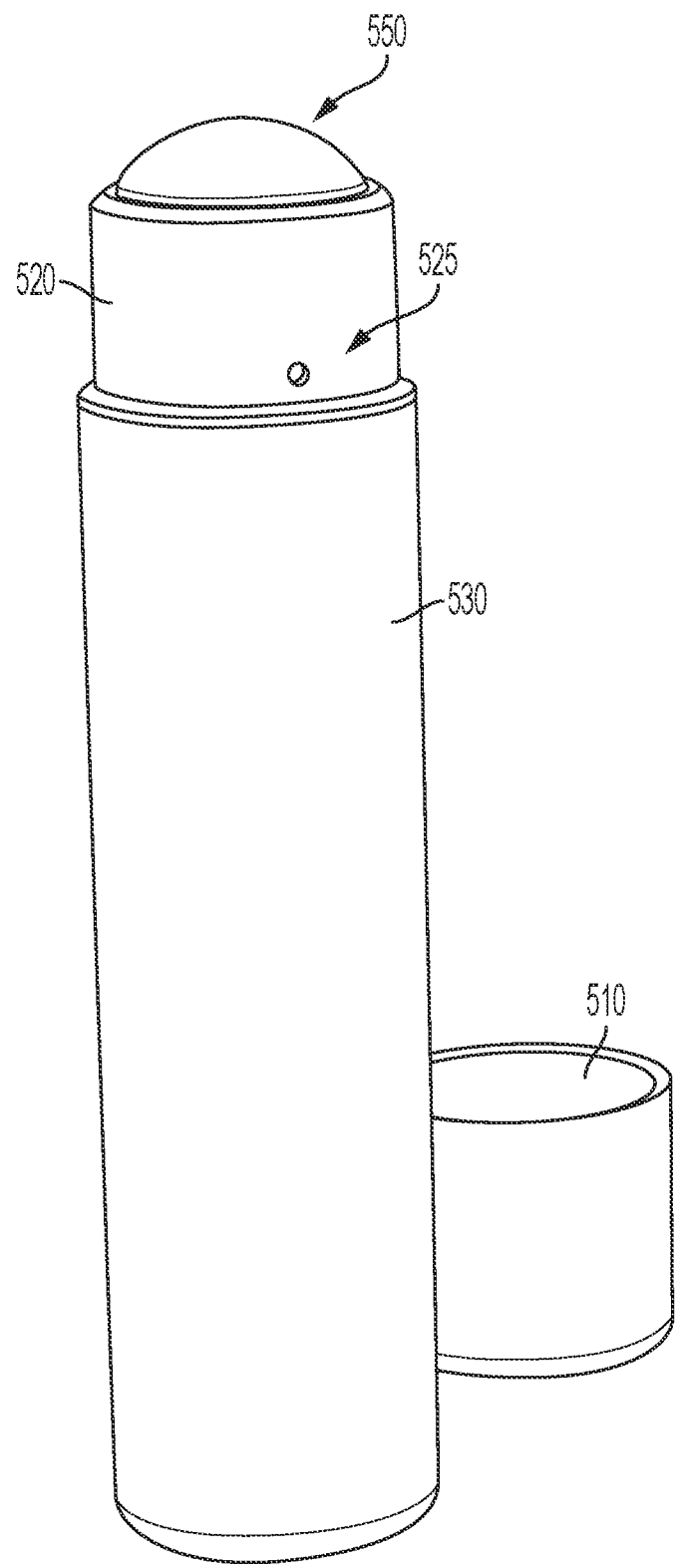
FIG. 28 is a perspective view of the packaging of FIG. 27.

FIGS. 23-26 illustrate an example for sustainably storing and/or shipping the replaceable bags 340 to a consumer. A storage tube 400 comprises a diameter that is similar to the diameter of the body 330 of the packaging 300. Such a dimension allows for the replaceable bag 340 to securely fit within the storage tube 400 without significant movement. The minimization of movement of the replaceable bag 340 during storage and/or shipping is ideal to prevent damage to the foil layer 390 or to the replaceable bag 340 itself. As shown in FIG. 25, a portion of the rigid plug 360 interfaces with a top surface of the storage tube 400 in a similar manner to the interface between the portion of the rigid plug 360 and the top surface of the body 330. The storage tube 400 is comprised of a sustainable material such as recycled pulp, for example. FIG. 26 depicts an example of replaceable bags 340 being shipped to a consumer in bulk. Each replaceable bag 340 is first packaged in the storage tube 400. The replaceable bags 340 are then packaged together in a shipping box 450 to allow for easy packing and/or removal.

Figure 29:
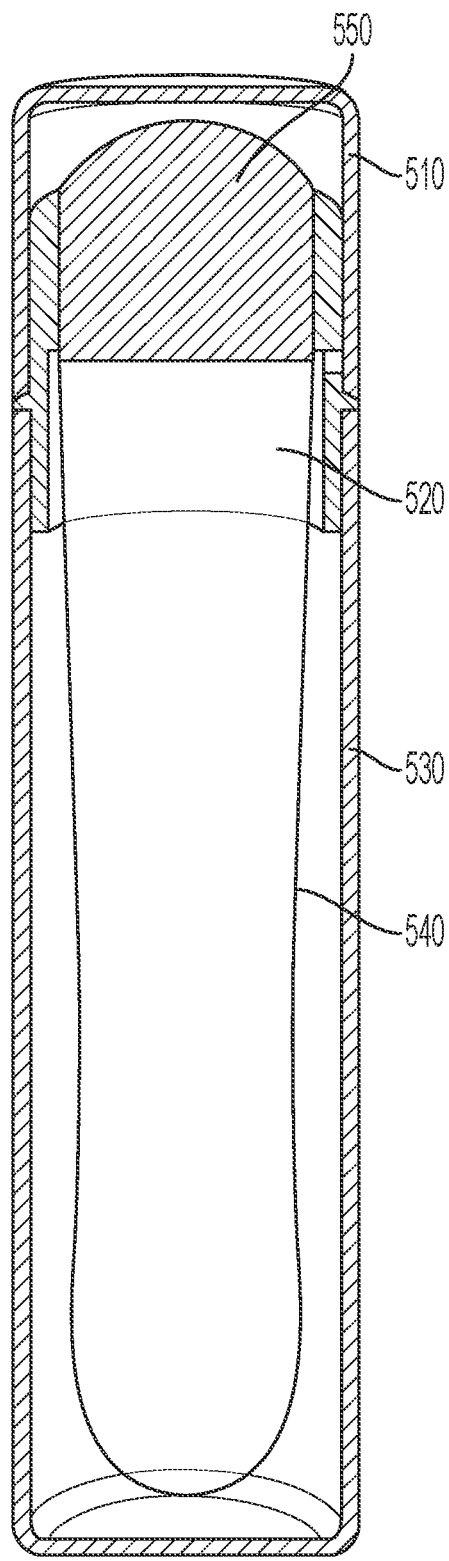
FIG. 29 is a cross-sectional view of the packaging of FIG. 27 comprising a bag.
Figure 29A:
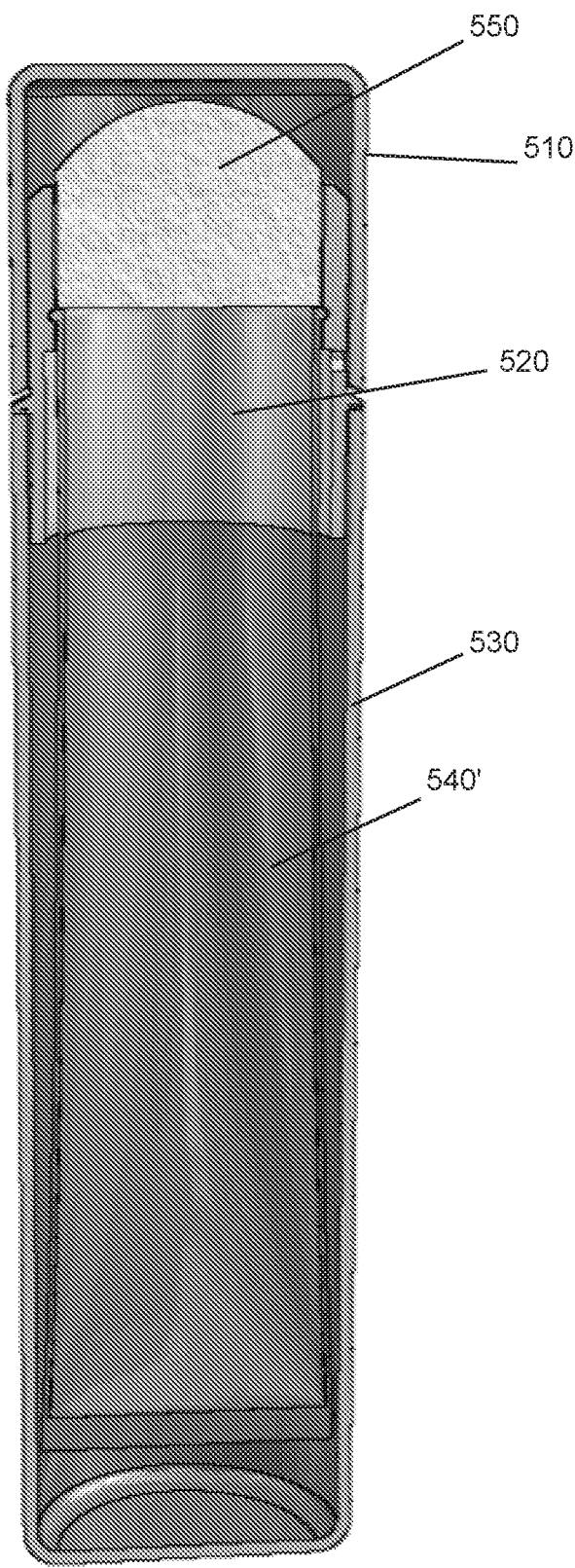
FIG. 29A is a cross-sectional view of the packaging of FIG. 27 comprising an extruded tube receptacle.

An packaging 500 is depicted in FIGS. 27-31. The packaging 500 comprises a lid portion 510, an intermediate connecting portion 520, and a body portion 530. The lid portion 510 is releasably attachable to body portion 530 through the intermediate connecting portion 520. In various instances, the packaging 500 does not comprise an intermediate connecting portion 520. In such instances, the body portion 530 and the lid portion 510 are configured to be directly attached to one another. The body portion 530 defines a reservoir configured to receive a receptacle therein. As shown in FIG. 29, the receptacle comprises a bag 540. In other instances, as shown in FIGS. 29A, the receptacle comprises an extruded tube 540'. The receptacles 540, 540' are similar in many respects to the bags 140, 140', 240, 340, 340' described in greater detail herein. For example, the receptacles 540, 540' are configured to be replaceable and/or refillable.

Figure 30:
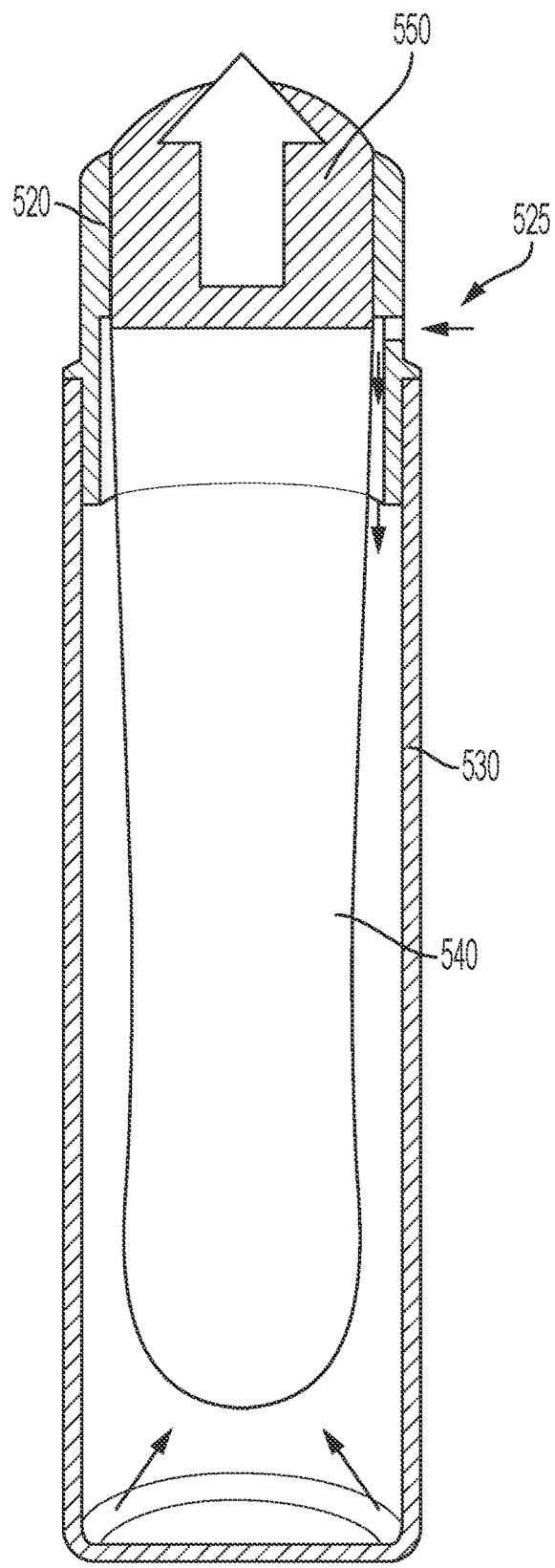
FIG. 30 is a partial cross-sectional view of the packaging of FIG. 27 comprising fluid contents stored therein.
Figure 31:
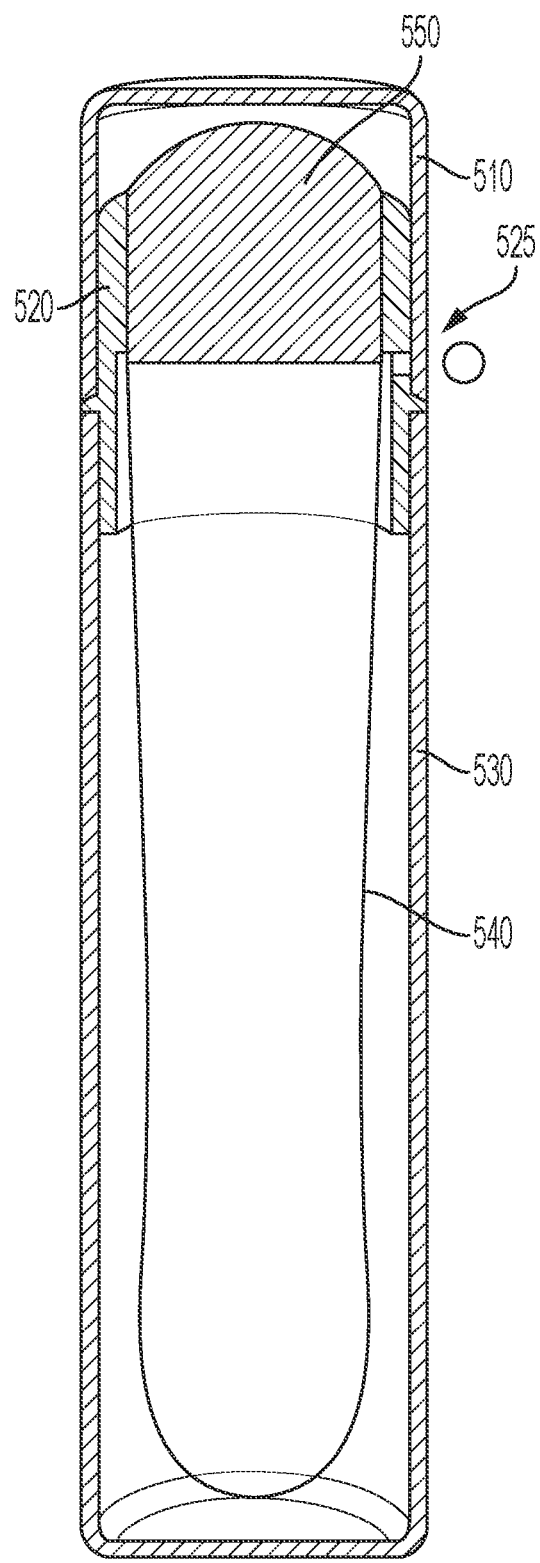
FIG. 31 is a cross-sectional view of the packaging of FIG. 30.

As shown in FIGS. 30 and 31, fluid contents are stored within the bag 540. Instead of a duckbill valve, the packaging 500 comprises a plug 550 that forms a barrier between the fluid contents stored within the bag 540 and the outside environment. An interior surface of the lid portion 510 is configured to form an airtight seal between the plug 550 and the exterior environment. Such an airtight seal can be formed through physical contact between the lid portion 510 and the plug 550. The plug 550 is comprised of a material, such as Porex®, for example. When the lid portion 510 has appropriately sealed the packaging 500, the plug 550 does not allow the contents of the bag 540 to seep through the plug. Stated another way, when the lid portion 510 is attached to the packaging 500, air cannot infiltrate the pores of the plug to replace the fluid contents of the bag 540.

When the lid portion 510 is removed from the packaging 500, the plug is configured to wick the contents of the bag 540. In various instances, the contents of the bag 540 comprise thin serums and/or cleansers. The body 540 of the packaging 500 does not comprise the one-way air valve described in connection with bodies 100, 200, 300. The absence of such an inlet valve renders the packaging 500 airless in a sense. A hole 525 is defined in the intermediate connecting portion 520 that extends into the reservoir of the body portion 530. Notably, the hole 525 does not extend into the bag 540. In instances where the packaging 500 does not comprise an intermediate connecting portion 520, the hole 525 is defined in the body portion 530. The hole 525 allows for air from the environment to enter into the reservoir of the body portion 530 as the fluid contents of the bag 540 are dispensed. As shown in FIG. 30, when the lid portion 510 is not longer attached to the intermediate connecting portion 520 and/or the body portion 530, the fluid contents of the bag 540 begin to seep out through the plug 550. As the fluid contents seep out through the plug 550 air is drawn into the reservoir of the body portion 530 through the aperture 525. Notably, the air does not come into contact with the fluid contents of the bag 540. Such an airless system is configured to dispense approximately 99% of the fluid contents stored therein. As shown in FIG. 31, attachment of the lid portion 510 prevents air from flowing into the reservoir of the body portion 130 as the lid portion 510 physically blocks the vent hole 525.

Various aspects of the subject matter described herein are set out in the following examples.

Example 1—A packaging for storing and dispensing fluid contents is disclosed. The packaging comprises a body defining a reservoir. The body comprises a base with an aperture defined therein. The packaging further comprise a receptacle configured to store the fluid contents therein. The receptacle is configured to be received within the reservoir of the body. A one-way valve is sized to be closely received in the aperture defined in the base of the body. The packaging further comprises an actuator comprising a channel and an opening configured to dispense the fluid contents out of the packaging. An intermediate connecting member extends between the body and the actuator. The intermediate connecting member comprises a first connection portion configured to engage the actuator, a bellow, a second connection portion configured to engage the body, and a duckbill valve integrally formed thereon. The duckbill valve is aligned with the channel. The fluid contents of the receptacle flow out of the duckbill valve, through the channel, and out of the opening upon a user applying an input to the actuator.

Example 2—The packaging of Example 1, wherein the receptacle comprises an extruded tube.

Example 3—The packaging of any one of Examples 1 and 2, wherein the receptacle comprises a poly bag.

Example 4—The packaging of any one of Examples 1-3, wherein at least a portion of the actuator is closely received within an inner circumference of the first connection portion.

Example 5—The packaging of any one of Examples 1-4, wherein the second connection portion is sized to be closely received within an inner circumference of the body.

Example 6—The packaging of any one of Examples 1-5, wherein a portion of the receptacle is configured to be positioned between an inner circumference of the body and the second connection portion.

Example 7—The packaging of any one of Examples 1-6, wherein the input comprises an application of a downward force sufficient to compress the bellow of the intermediate connecting member.

Example 8—The packaging of any one of Examples 1-7, wherein the receptacle is refillable.

Example 9—The packaging of any one of Examples 1-8, wherein the receptacle is replaceable.

Example 10—The packaging of any one of Examples 1-9, further comprising a rigid plug configured to retain the receptacle in an upright configuration.

Example 11—A packaging for storing and dispensing fluid contents is disclosed. The packaging comprises a body defining a reservoir, and a replaceable bag configured to store the fluid contents therein. The body comprises a base with an aperture defined therein. The replaceable bag is configured to be attached the body. A one-way valve is sized to be closely received in the aperture defined in the base of the body. The packaging further comprises an actuator comprising a channel and an opening configured to dispense the fluid contents out of the packaging. An intermediate connecting member extends between the body and the actuator. The intermediate connecting member comprises a first connection portion configured to engage the actuator, a bellow, a second connection portion configured to engage the body, and a duckbill valve integrally formed thereon. The duckbill valve is aligned with the channel. The fluid contents of the replaceable bag flow out of the duckbill valve, through the channel, and out of the opening upon a user applying an input to the actuator.

Example 12—The packaging of Example 11, further comprising a rigid plug configured to securely position the replaceable bag within the body.

Example 13—The packaging of any one of Examples 11 and 12, wherein the replaceable bag is refillable.

Example 14—The packaging of any one of Examples 11-13, further comprising a foil layer positioned on the replaceable bag prior to attachment of the replaceable bag to the body.

Example 15—The packaging of any one of Examples 11-14, wherein the replaceable bag comprises an extruded tube.

Example 16—The packaging of any one of Examples 11-15, wherein the replaceable bag comprises a poly bag.

Example 17—A packaging for storing and dispensing fluid contents is disclosed. The packaging comprises a lid portion and a body portion defining a reservoir. The body portion comprises a hole defined therein, and the hole extends into the reservoir of the body portion. A receptacle is configured to store the fluid contents therein, and the receptacle is configured to be received within the reservoir of the body portion. The packaging further comprises a plug affixed to the body portion. The plug is comprised of a material that prevents the fluid contents from leaking when the lid portion is attached to the body portion. The plug is configured to wick the fluid contents stored in the receptacle when the lid portion is not attached to the body portion.

Example 18—The packaging of Example 17, wherein the receptacle is replaceable.

Example 19—The packaging of any one of Examples 17 and 18, wherein the receptacle is refillable.

Example 20—The packaging of any one of Examples 17-19, wherein the hole is defined at a position on the body portion below the plug.

Example 21—The packaging of any one of Examples 17-20, wherein the receptacle comprises a thin-walled extruded tube.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A packaging for storing and dispensing fluid contents, wherein the packaging comprises:
    a body defining a reservoir, wherein the body comprises a base with an aperture defined therein;
    a receptacle configured to store the fluid contents therein, wherein the receptacle is configured to be received within the reservoir of the body;
    a one-way valve sized to be closely received in the aperture defined in the base of the body;
    an actuator, comprising:
        a channel; and
        an opening configured to dispense the fluid contents out of the packaging; and
    an intermediate connecting member extending between the body and the actuator, wherein the intermediate connecting member comprises:
        a first connection portion configured to engage the actuator;
        a bellow;
        a second connection portion configured to engage the body; and
        a duckbill valve integrally formed thereon, wherein the duckbill valve is aligned with the channel, and wherein the fluid contents of the receptacle flow out of the duckbill valve, through the channel, and out of the opening upon a user applying an input to the actuator.

2. The packaging of claim 1, wherein the receptacle comprises an extruded tube.

3. The packaging of claim 1, wherein the receptacle comprises a poly bag.

4. The packaging of claim 1, wherein at least a portion of the actuator is closely received within an inner circumference of the first connection portion.

5. The packaging of claim 1, wherein the second connection portion is sized to be closely received within an inner circumference of the body.

6. The packaging of claim 1, wherein a portion of the receptacle is configured to be positioned between an inner circumference of the body and the second connection portion.

7. The packaging of claim 1, wherein the input comprises an application of a downward force sufficient to compress the bellow of the intermediate connecting member.

8. The packaging of claim 1, wherein the receptacle is refillable.

9. The packaging of claim 1, wherein the receptacle is replaceable.

10. The packaging of claim 1, further comprising a rigid plug configured to retain the receptacle in an upright configuration.

11. A packaging for storing and dispensing fluid contents, wherein the packaging comprises:
    a body defining a reservoir, wherein the body comprises a base with an aperture defined therein;
    a replaceable bag configured to store the fluid contents therein, wherein the replaceable bag is configured to be attached the body;
    a one-way valve sized to be closely received in the aperture defined in the base of the body;
    an actuator, comprising:
        a channel; and
        an opening configured to dispense the fluid contents out of the packaging; and
    an intermediate connecting member extending between the body and the actuator, wherein the intermediate connecting member comprises:
        a first connection portion configured to engage the actuator;
        a bellow;

a second connection portion configured to engage the body; and a duckbill valve integrally formed thereon, wherein the duckbill valve is aligned with the channel, and wherein the fluid contents of the replaceable bag flow out of the duckbill valve, through the channel, and out of the opening upon a user applying an input to the actuator.

12. The packaging of claim 11, further comprising a rigid plug configured to securely position the replaceable bag within the body.

13. The packaging of claim 11, wherein the replaceable bag is refillable.

14. The packaging of claim 11, further comprising a foil layer positioned on the replaceable bag prior to attachment of the replaceable bag to the body.

15. The packaging of claim 11, wherein the replaceable bag comprises an extruded tube.

16. The packaging of claim 11, wherein the replaceable bag comprises a poly bag.

17. The packaging of claim 1, wherein the intermediate connecting member is to replaceably extend between the body and the actuator.

18. The packaging of claim 1, wherein the aperture comprises a through hole.

* * * * *